(12) United States Patent
Lee

(10) Patent No.: US 9,733,727 B2
(45) Date of Patent: Aug. 15, 2017

(54) OPTICAL MOUSE WITH CURSOR ROTATING ABILITY

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 56 days.

(21) Appl. No.: 14/056,140

(22) Filed: Oct. 17, 2013

(65) Prior Publication Data

US 2014/0160021 A1    Jun. 12, 2014

Related U.S. Application Data

(60) Provisional application No. 61/734,574, filed on Dec. 7, 2012.

(51) Int. Cl.
| | | |
|---|---|---|
| *G06F 3/033* | (2013.01) | |
| *G06F 3/03* | (2006.01) | |
| *G06F 3/0354* | (2013.01) | |

(52) U.S. Cl.
CPC .......... *G06F 3/0308* (2013.01); *G06F 3/0317* (2013.01); *G06F 3/03543* (2013.01)

(58) Field of Classification Search
CPC ...... G06F 3/0346; G06F 3/0304; G06F 3/038; G06F 3/017; G06F 1/1626
USPC .......................................... 345/158, 163, 166
See application file for complete search history.

(56) References Cited

U.S. PATENT DOCUMENTS

| | | | |
|---|---|---|---|
| 6,392,632 B1 | 5/2002 | Lee | |
| 7,737,947 B2 * | 6/2010 | Schroeder | G06F 3/03545 345/166 |
| 8,077,147 B2 | 12/2011 | Krah et al. | |
| 8,279,279 B2 | 10/2012 | Hattori et al. | |

(Continued)

FOREIGN PATENT DOCUMENTS

| | | |
|---|---|---|
| EP | 1 113 385 | 7/2001 |
| EP | 1 473 623 | 11/2004 |
| EP | 1 804 154 | 7/2007 |

OTHER PUBLICATIONS

"Review of CMOS image sensor," by M. Bigas, et al., Microelectronics Journal 37, Sep. 6, 2005, pp. 433-451, www.elsevier.com/locate/mejo.

(Continued)

*Primary Examiner* — Claire X Pappas
*Assistant Examiner* — Ngan T Pham Lu
(74) *Attorney, Agent, or Firm* — Saile Ackerman LLC; Stephen B. Ackerman

(57) ABSTRACT

A surface navigation device for a computer or similar graphical display and methods for implementing its operation. The device moves sensitively and precisely over a surface such as a desktop and operator generated changes in its position relative to targetable objects on that desktop arranged about the circumference of a pseudo-circle are described in terms of a lumped motion vector. The motion vector is decomposed into a translational and rotational part by metrical and topological methods. The device communicates each part of the decomposed motion quickly and accurately to a computer screen or other display where it may implement the motion of a cursor or it may be used to manipulate objects having a 3D character by providing them with translational and rotational motions. The rotational parameter generated by the device may also be used independently to trigger some computer action.

49 Claims, 7 Drawing Sheets

(56) References Cited

U.S. PATENT DOCUMENTS

| | | | |
|---|---|---|---|
| 2004/0190092 A1* | 9/2004 | Silverbrook | G06F 3/03545 358/539 |
| 2004/0212587 A1* | 10/2004 | Kong | G06F 3/0317 345/156 |
| 2005/0151724 A1* | 7/2005 | Lin | G06T 7/2026 345/166 |
| 2006/0066572 A1 | 3/2006 | Yumoto et al. | |
| 2006/0208155 A1* | 9/2006 | Brosnan | G05D 1/0246 250/208.1 |
| 2006/0267940 A1* | 11/2006 | Groom | G06F 1/1626 345/163 |
| 2010/0001950 A1 | 1/2010 | Fouquet et al. | |
| 2010/0036393 A1 | 2/2010 | Unsworth | |
| 2011/0074676 A1* | 3/2011 | Gao | G06F 3/0317 345/158 |
| 2011/0234815 A1* | 9/2011 | Zahnert | G06K 9/228 348/207.1 |
| 2011/0234825 A1* | 9/2011 | Liu | H04N 5/23248 348/208.5 |
| 2011/0304541 A1 | 12/2011 | Dalal | |
| 2012/0068927 A1* | 3/2012 | Poston | G06F 3/0317 345/163 |
| 2012/0127077 A1* | 5/2012 | Chen | G06F 3/0317 345/166 |
| 2013/0002555 A1 | 1/2013 | Lee | |
| 2013/0241835 A1 | 9/2013 | Lee | |
| 2014/0085205 A1* | 3/2014 | Kim | G05G 9/04 345/163 |
| 2015/0061510 A1* | 3/2015 | Maxik | A01G 7/045 315/153 |

OTHER PUBLICATIONS

"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.

"TwistMouse for Simultaneous Translation and Rotation," by Jacqui Hannagan, A dissertation submitted for the partial fultulment of the requirements for the degree of Bachelor of Commerce (Honours), at the University of Otago, Dunedin, New Zealand, Nov. 14, 2007, pp. 1-117.

"Sensing angular change through a small optical window," by Tim Poston et al., May 29, 2006, pp. 1-18, found: www.mit.edu/~srimano/papers/3DoFSensing.pdf.

"Sensing Linear and Angular Change Through a Small Optical Window," by Tim Poston et al., pp. 1-9, found Oct. 3, 2013, http://www.mit.edu/~srimano/research/mushaca/SLA.htm European Search Report 13368043.9-1972/2741179, Mar. 31, 2015, Wen-Chieh, Geoffrey Lee.

* cited by examiner

|   |   |   |   |
|---|---|---|---|
| R | C | B | C |
| C | B | C | R |
| B | C | B | C |
| C | R | C | R |
501 502 503
FIG. 5C
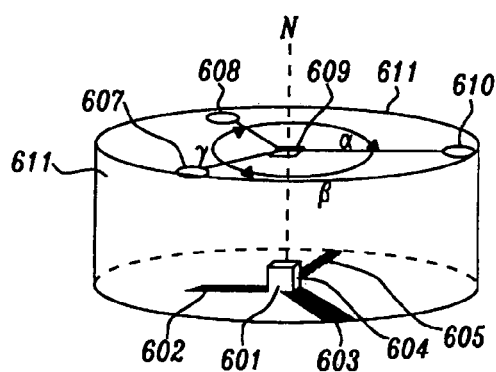
FIG. 6A
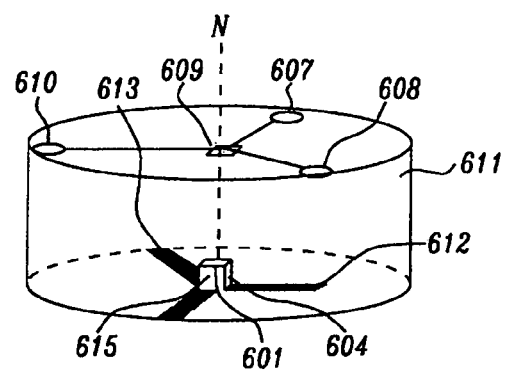
FIG. 6B

OPTICAL MOUSE WITH CURSOR ROTATING ABILITY

This application claims the benefit of U.S. Provisional Application Ser. No. 61/734,574, filed on Dec. 7, 2012, and herein incorporated by reference in its entirety.

RELATED PATENT APPLICATION

This application is related to U.S. patent application Ser. No. 13/834,085, filed on Mar. 15, 2013, which is herein incorporated by reference in its entirety.

BACKGROUND

1. Technical Field

The present disclosure relates to a motion navigation device for use with computer or other electronic devices employing graphical displays.

2. Description

As a conventional optical mouse moves along a surface, such as the surface of a desktop, it computes and provides to an associated computer its translational motion vectors (i.e. displacement components $\Delta x$, $\Delta y$, or velocity components if needed) relative to that surface. Using those translational motion vectors, the computer or other display-capable device can maneuver a cursor or other objects that are graphically displayed. However, the conventional optical mouse only provides two-dimensions (2D) of translational motion that the computer can implement. A third motional dimension, corresponding to rotational motions of the mouse, could produce a rotation of the object on the display that is directly correlated to those rotations. However, this third dimension of mouse motion is not provided to the computer, so an object on the display screen cannot easily or directly be made to rotate along with the corresponding rotation of the mouse.

In modern display-capable electronic devices, such a restricted motional functionality cannot satisfy the needs of many consumers. An increasing number of application programs require a 3D (three-dimensional) perspective when displaying and manipulating graphically generated objects. For such applications, the motion of the displayed object may require both translational and rotational components. For example, the computer graphics program AUTOCAD™ is used by many engineers and designers to render the drawings of mechanical parts with three-dimensional realism. As the AUTOCAD™ program gradually evolves into one with a full 3D capability, pipes, valves, and many similar realistically rendered mechanical parts will need to be rotated on the displaying device in a quick and accurate fashion, in response to the operator's instructions. Unfortunately, a "perspective adjustment" (i.e. changing the viewing angle of the object) cannot be done directly using the conventional optical mouse because the conventional optical mouse has only 2D (two-dimensional) functionality. Even though the operator may rotate the 2D mouse on its surface, the results of that rotation have no effective way of being implemented by the computer.

In the computer vision industry, which deals with the graphical display of the motion of a moving object, a vast amount of effort has been put into motion analysis using video/graphical rendering devices. In this area, the typical motion analysis tasks can be roughly characterized by, for example, 2D-2D, 2D-3D, and 3D-3D, depending on the correspondences between the device actually sensing the motion of a moving object (e.g. a CMOS image sensor) and the rendering device on which the moving object is graphically shown (e.g. a flat panel display). However, in contrast to the improvement in rendering devices, there have been fewer development efforts being applied to cursor maneuvering on a display screen. Such an improvement is an object of this disclosure.

To better understand the shortcomings of the prior art and for purposes of making comparisons with the present approach, we begin with Equ. 1 for the basic motion of an object under translations and rotations. For an object located at point p, having coordinates x, and y, which can be represented as a column vector.

$$\begin{bmatrix} x \\ y \end{bmatrix},$$

its final position after going through a general maneuvering action can be determined by the translational displacement (denoted by the letter d in Equ. (1)) and rotational displacement (the rotational operator being denoted by letter M).

$$Mp + d = \begin{bmatrix} S_x \cos\theta_x & -S_y \sin\theta_y \\ S_x \sin\theta_x & S_y \cos\theta_y \end{bmatrix} \begin{bmatrix} x \\ y \end{bmatrix} + \begin{bmatrix} d_x \\ d_y \end{bmatrix} \quad (1)$$

Here $$\begin{bmatrix} d_x \\ d_y \end{bmatrix}$$

denotes the translational displacement, M operating on p denotes the rotational displacement around the x and y axes (i.e., $\theta_x$ and $\theta_y$), and S is the scaling factor along an axis (e.g. x or y).

The conventional optical mouse does not implement a parameter such as $\theta_x$ and $\theta_y$ (i.e. a rotation angle about an axis), in a way that can be easily calculated and used in the conventional art. Specifically, the motion vector communicated by the conventional optical mouse to the computer is only a translational motion vector. Limited by such a situation, as Equ. (1) reveals, it is only the quantity d, rather than M (i.e. M=0) that can be manipulated by the conventional mouse. When the situation requires a rotational movement for said object, M must be calculated by other means. For example, when an operator desires to rotate an object in a fully 3D manner, e.g. as in spinning a moving ball, the 2D motion vector provided by the conventional mouse must be continually recalculated by the computer so that a new pair of rotational angles $\theta_x$ and $\theta_y$ for the spinning ball is derived at each of the various points along its path. This procedure is not as simple as might be imagined and is implemented in two successive steps at each point where a rotation about an axis is desired. First, the computer program receiving the conventional mouse input must be instructed to stop accepting and treating the motion vectors sent by the conventional optical mouse as being translational movement. This is usually done by clicking a special button on the mouse. Second, the computer is instructed to designate an axis of rotation for the object of interest, so that the computer can then calculate the rotational vector about that axis using the translational motion vector ($\Delta x$, $\Delta y$) it has already received. Of course, the relative distance between the axis and the cursor's position on the display has vital influences on the angles, $\theta_x$ and $\theta_y$, of rotation about that axis. Even for equal values, $\Delta x$, $\Delta y$, of the translational displacement, the calculated rotational angles $\theta_x$ and $\theta_y$ can be different if different pivots are selected. One must also bear in mind that pivots themselves are usually not displayed on the displaying device. Thus, the operator may easily ignore their existence. As the display program continues to operate, the pivot may change its position from time to time. For example, when the operator moves a mouse cursor over a crane machine graphically displayed on a 3D displaying device, the pivot point selected for rotational motion of the crane arm can be automatically changed by the computer in following the maneuvering act of the mouse cursor. Whenever there is a change in the pivot selection, the rotational motion vector derived using the same 2D movement of the mouse cursor is also changed. Thus, the operator can be easily confused by the ever changing results of shifting between translation and rotation when using the conventional optical mouse.

The increasing popularity of role-playing games (and applications of animated graphics generally) furnishes us with yet another example of the inadequacies of the 2D optical mouse in a 3D world. Consider the following imagined video game program sequence based on possible Disney (or similar) characters. In this imagined scenario Peter Pan is battling Captain Hook. Captain Hook is taller, and has a sword much longer than Peter Pan's dagger. To fight Captain Hook, Peter Pan must use his dagger with cleverness and agility. When Captain Hook's sword thrusts in, Peter Pan must swing his dagger and hop to avoid the sword, as the operator would undoubtedly have instructed him to do. To swing the dagger, the operator must give a rotational instruction. To hop, the operator must give the translational motion instructions. Unfortunately, the Peter Pan object created by today's computer game cannot easily swing his dagger from one angle to another following the mouse's instruction sent by the operator. Nor can Peter Pan easily fly around Captain Hook in a 3D arc. These long anticipated actions and movements of Peter Pan exist in every child's mind, but they are literally sacrificed by the technological shortcomings of a conventional optical mouse. This condition of motional limitation has been transmitted to all computer aided graphic arts. That is, almost all animated creatures in today's electronic graphic arts (e.g. Pixar's motion pictures) act robotically, lacking the delicate, gestures that can be produced by human arms and wrists. We will now present a schematic mathematical and pictorial example illustrating the shortcomings of the conventional art approach in transferring the motion of a conventional art mouse to a computer display.

FIG. 1 schematically depicts the successive positions of three exemplary targeted objects (105, 106, 107) located on a desktop over which an optical mouse might navigate. For simplicity, we assume they happen to lie initially on the circumference of a circle 110 with center 108 and that this is how they appear in an image sensor of a conventional art optical mouse at initial time $t_0$. At a subsequent time $t_1$, they will still lie on a circle, but the circle will now be labeled 111 and have center 109. This circle might actually be denoted a "pseudo-circle," because it is not a physical structure on the desktop as are the targeted objects; the pseudo-circle will serve as a framework for the locations of the physical objects so that we can analyze their motion both algebraically and geometrically. For simplicity, however, the pseudo-circle will hereinafter simply be called a circle, unless we wish to emphasize its lack of physical properties. In addition, what we are now calling a "geometrical" analysis will later be denoted a topological analysis to allow for greater generality.

The image frame 101 formed by the mouse sensor is schematically represented as an 8×10 rectangular checkerboard pattern of pixels, using numbers vertically and letters horizontally as pixel labels.

At time $t_0$, the three objects, shown as dark circles 105($t_0$), 106($t_0$), and 107($t_0$), are located, respectively, at pixels (C, 2), (H, 4), and (D, 7) in the image frame 101. At later time $t_1$, they will be located at new positions 105($t_1$), 106($t_1$) and 107($t_1$), assumed to lie in the same image frame. The motion of the mouse producing this positional change of the three targetable objects in its image frame is assumed to be an arbitrary combination of a translation, T, of the circle 110 to become circle 111, and moving its center from 108 to 109, combined with a rotation, R, clockwise about the final circle center 109. We, therefore, describe the corresponding total displacement vectors of the three objects (or any one of them) within the image frame as being composed of both a translational displacement vector 104 (here, an arrow from the center 108 of the circle 110 to 109, the center of circle 111) and a rotational displacement vector 112 (here shown as the tangential displacement vector of 105($t_0$) on the circle 110).

At time $t_0$, objects 105($t_0$), 106($t_0$), and 107($t_0$) are positioned on circle 110 whose geometrical center is labeled 108 (small dark dot). When the time has elapsed to $t_1$, the three objects have moved to new locations (still assumed to be within the same image frame 101) which now lie on the circumference of circle 111, which has a center 109 (small dashed dot). Note that 108, which denotes the geometrical center of circle 110, is moved to a new position, as the center of circle 111, and is now denoted as 109. The vector 104, drawn as an arrow from 108 to 109, is the displacement vector of the circle center. The vector 112, also drawn as an arrow, describes the angular displacement of 105($t_0$), relative to the image frame. Note we treat this vector as being tangential to the circle and, for small rotations, it would have a length proportional to the product of the angular rotation of the circle (expressed in radians) and the radius of the circle.

Comparing the pixel addresses of the two circle centers 108 and 109, one observes that this "pseudo-object" (pseudo, because, like the circle itself, its center is not visible to the sensor) only moves from (E, 4.5) to (F, 4.5), there is no net motion in the vertical Y axis of the image frame. The two circle centers, 108 and 109, for the group entity formed by the location of the three objects on the circumference of a circle, remain on the horizontal line denoted 4.5. Prior art methods would have traced the motion of the individual objects (105), (106) and (107), from $t_1$ to $t_1$ and would have formed no concept of the circle 110 (or 111) as defining a group entity.

To analyze prior art's approach which fixes on the three real objects and not the pseudo-circle, we can decompose the net displacement of object 105($t_0$) into a translational motion vector and a rotational one, which results in the following description of its subsequent movement:

(1) Object 105 ($t_0$) first moves from its original pixel location (C, 2) by the translational vector 104, which subsequently takes it to an intermediate position, which we will call the "translated" position 105(Trans).

(2) The intermediate translated object, 105(Trans), then moves to the next location in accord with rotational, R, motion vector 112, which takes it to the final position at (E, 1), denoted as the rotated position 105(Rot).

(3) The pixel address of the final object 105(Rot), is (E, 1). Comparing this final position to the initial position (C, 2) of object 105($t_0$), the object has moved by a net displacement vector with components determined as the difference in its pixel coordinates: ((E, 1)−(C, 2))=(2, −1), where we assign numerical values to the E and C positions.

Using the same technique on objects 106($t_0$) and 107($t_0$), one will find the net displacement vector of 106($t_0$) is (1, −1), and that of 107($t_0$) as (0, −1), respectively.

If the role played by rotational motions in this displacement process is not clearly understood, the discrepancies between the displacement vectors of 105($t_0$), 106($t_0$), and 107($t_0$) (i.e. (2, −1), (1, −1), and (0, −1) can be quite mysterious to the device operator. The device operator in the prior art would see no easy method to even recognize the role of rotations in this net motion, let alone to use them in a systematic way. It is simpler to make the effects of rotations "go away," so that all motions of the prior art mouse are made to look like pure translations and are treated as such. In order to "bandage" the problem of unusable and unused rotations, the prior art may:

(A) Pick only objects of interest that lie on a very small circle (i.e. make the radius of circle 110 very small, so that the rotational motion vector (whose magnitude depends on the radius) can be ignored. This has a drawback—when the objects are congested in a narrow space, they may easily be merged with the one another as a single object body in the image frame. This problem will be exacerbated when the morphology of the targeted desktop surface is very flat. In fact it has become a common experience to almost all users that a very smooth or white surface may stall the conventional optical mouse easily (i.e. spurious spots are not differentiated from the targeted spots in the image frame).

(B) Use very high frame rate (e.g. >1000 frames/sec), so that the rotational motion vector between two consecutive image frames cannot be detected easily (i.e., the angular displacement is very small). The drawback of this tactic is that it leads to rapidly increasing power consumption.

(C) Use a coherent light source (e.g. laser) or dark field technique (this has more to do with the lens and aperture design) to differentiate the targeted objects from the background scene. These techniques are the facilitative means of tactic (A). Coherent light helps the prior art pick out objects from even smaller area (i.e. the radius of circle 102 is even smaller). A laser light source, as can be expected, is power consuming.

As one may easily conclude from the necessity of using any of the above tactics, the prior art has not developed a fast and robust means to derive and use the actual rotational motion vectors. Although the prior art does teach various approaches to address these issues, such as are to be found in Geoffrey Lee (U.S. Pat. No. 6,392,632), Wen-Chieh Geoffrey Lee (US Pat. Appl. 2013/002555), where both of the previous prior arts are fully incorporated herein by reference. Also, see Hattori et al. (U.S. Pat. No. 8,279,279), Unsworth (US Pat. Appl. 2010/0036393), Fouquet et al. (US Pat. Appl. 2010/0001950), Dalal (US Pat. Appl. 2011/0304541), Zahnert et al. (US Pat. Appl. 2011/0234815) and Krah et al. (U.S. Pat. No. 8,077,147). However, none of these approaches will provide the present device and teach its operation as will be described below.

We now summarize the foregoing discussion. The prior art computer mouse is basically a maneuvering device for a cursor or other graphically generated object displayed on a computer screen or similar display screen. It provides that maneuverability by determining its own motion relative to a surface that contains identifiable and traceable objects. That motion is transmitted to the computer where it is converted to on-screen motion of a graphically generated object. Although the motion of the prior art mouse contains rotational as well as translational elements, there is no practical way to identify or compute the rotational elements, so their existence is in effect ignored, and the mouse sends data to the computer indicating all of its motions as being translational. In order that this intentional fiction shall not create serious divergences between actual mouse motion and on-screen motion, the prior art mouse must be operated in such a way that the discrepancies are minimized and that effects that to not correspond well to translational motion are treated as noise.

When considering the positional accuracy of a cursor maneuvering device, the prior art often refers to two parameters—the SQUAL (Surface QUALity), a surface parameter associated with the numbers of pixels in an image frame being identified as a traceable object, and the dpi (dots per inch), a mouse parameter, giving the number of dots per square inch of the surface that are resolvable as pixels in an image frame.

The parameter SQUAL in effect is used to denote the quality (i.e. presence of identifiable objects) of the surface upon which the mouse unit is positioned. For example, when an optical mouse is placed on a flat surface, the SQUAL value is low, while on a rough surface it is high. A surface with low SQUAL value (e.g. a glossy, flat, or white surface) will provide a low dpi value; by the same token, a surface with high SQUAL (e.g. a rough surface) will provide higher dpi. The resolution of the mouse, on the other hand, is provided by its dpi. Of course, the motion vectors generated by a mouse unit with high dpi will provide higher positional accuracy for a cursor or for the object displayed in the graphical rendering device. A question that still remains unanswered is how a motion vector generated by motion relative to a surface with a specific SQUAL index is to be correlated to the positional accuracy of a cursor maneuvering device.

SUMMARY

A first object of the present disclosure is to create a navigation and motion sensing device for the next generation of computers and electronic products, particularly those having interactive graphical displays that are three-dimensional in nature. The navigation device will be capable of manipulating the position of an object rendered by the graphical display or of controlling some functionality of the computer or electronic product.

A second object of the present disclosure is to create such a device that includes a motion feature that moves relative to a reference surface and transmits data to a computer or electronic device that characterizes that relative motion. The full range of movement of the motion feature across the reference surface, which is controlled by actions of an operator's fingers, will be quickly, easily and accurately transformed into corresponding motions of images (eg. a cursor or other graphically generated image) on the display or, it can also be used to activate certain functions of the computer or electronic display device. The motion feature may be an optical mouse and the reference surface may be a desktop surface.

A third object of the present disclosure is to create such a device wherein the motion of the device is determined by sensing the relative motions of targetable objects on the desktop which, in turn, are expressed in terms of separate translational and rotational motion vectors that are simultaneously and independently determined by identification of the linear and non-linear components of the total relative motion vectors.

A fourth object of the present disclosure is to create such a device wherein the process of deriving a rotational motion vector will require a sufficiently minimal degree of mathematical effort so that the device can be both quickly responsive and power conserving.

A fifth object of the present disclosure is to provide such a device and its method of use that can be easily adapted to various kinds of applications requiring the identification and manipulation of graphic objects, thereby allowing the use of different algorithms, different fuzzy logic functions, different image capturing means and different game console controlling methods.

A sixth object of the present disclosure is to derive the translational and rotational motion vectors of an object that is presented as multiple clusters of points in an image frame.

A seventh object of the present disclosure is to derive the translational and rotational motion vectors of an object based on changes in hue or angle of cast shadows.

An eighth object of the present disclosure is to derive the translational and rotational motion vectors of an object based on its image variation in primary colors.

A ninth object of the present disclosure is to derive the rotational motion vectors of an object from its translational motion vectors.

A tenth object of the present disclosure is to provide a method of decomposing object motion into its translational and rotational parts in a manner that is independent and that can be verified by symmetry considerations.

These objects will be achieved by implementing a set of mathematical methods and by various embodiments of a device that implements those methods. The methods and device embodiments will allow the embodied device to be navigated across a reference surface (e.g. a desktop) in a measurable way. This measurable way is achieved by generating the motion (e.g. the total displacement vector or the velocity vector if required), relative to the device, of a set of "targetable objects" on the reference surface. These targetable objects may be a group of fixed points, or clusters of fixed points, in single or multiple hues, or the shadows cast by those points, in single or multiple hues, on that reference surface. Moreover, these targetable objects may be chosen so that they are arranged about a virtual geometrical figure, such as a "pseudo-circle" (so denoted because it is not a physical object on the surface but is used for reference purposes), which enables their motion to be determined. That general motion is then decomposed into translational and rotational vectors that correspond to linear and non-linear portions of the total displacement respectively. In this way, the motion (i.e. displacement or velocity) of the device over the surface, as controlled by its user, can be obtained in terms of the relative motion of identifiable and targetable objects. That relative motion, in turn, can be decomposed into its translational and rotational parts, corresponding to linear and non-linear parts, so that the device can quickly, sensitively and precisely determine and convert its own motion into a corresponding motion of an image on a display screen.

Based on the above, one will understand that the presently disclosed device and its method of use outperforms prior art devices because it can derive the translational and rotational motion vectors quickly and with high accuracy. We will demonstrate that the rotational motion provided by the device corresponds to non-linear terms in the displacement vector between successive image frames and that the prior art has not produced any effective means to identify and utilize these terms, or to eliminate them. As we have said above, the prior art tries to ignore the non-linear terms in the relative motion of a cluster of surface objects arrayed on a pseudo-circle by either shrinking the circle, which is a geometrical artifice, or reducing its angular rotation in a given amount of time by increasing shutter speed by taking more frames per second. Thus, in the prior art, the non-linearity of rotation is, in effect, used as an artifice to remove important features inherent in the displacement, rather than to benefit from them. In the past, the mouse industry simply restricted the user in certain applications by restricting the allowable value of SQUAL to be only within a certain range. Literally, a prior art mouse device makes it clear to the user that all motion vectors it measures include some kind of non-linear effect, but it provides no means to differentiate the non-linear effect from the linear one, let alone take advantage of it. That differentiation between linear and non-linear terms describing the motion of the device and methods of its use is precisely the subject of this disclosure.

The decomposition of the displacement vector (and/or a corresponding relative velocity vector if desired) of the present device can be obtained by comparing the information contained in successive image frames generated by the device as the device moves over the reference surface or desktop. This information is conveniently expressed as blocks of pixels generated by one or more optical sensors that are either sensitive to monochromatic light or sensitive to multiple colors (polychromatic sensors). The movement of the pixels in corresponding successive image frames can be analyzed using metrical or topological (geometric) methods, to take into account that part of the pixel movement corresponding to the actual relative motion of physical objects on the reference surface and that part corresponding to the optical properties of pixel motion in an image frame. The combination of the actual and optical effects, without regard to their origins, produces what is called herein a "lumped" displacement vector, from which the translational and rotational parts of the device motion are extracted. We note that the terms topological and geometrical can be interchanged in much of what follows. Typically it is the geometry of a system that enables us to apply topological methods. Suffice it to say that what are called topological methods are the methods that do not rely on the direct measurement of distances between objects but rather rely on geometrical and shape relationships.

The distribution of digitized data in the blocks of pixels can be further expressed using discrete Fourier transformations between a positional frame of reference (e.g. the pixels in the image frame) and a frequency frame of reference, so that different levels of image structure in positional space can be interpreted through corresponding ranges of frequencies in a frequency space. Methods will also be given so that successive blocks of pixels can be identified and compared through their symmetries, enabling the motion vectors that determine differences between them to be identified and computed with confidence. In addition, where conflicts in image identification might exist, as a result of actual motions or of optical artifacts, the device is capable of using information provided by the motion and coloring of shadows cast by the objects composing the image. In this way, highly sensitive information regarding the shapes of object clusters can be distinguished from noise and rotational information can be extracted with confidence. Finally, issues of image identification can also be resolved using fuzzy logic algorithms, wherein the decisions are made based on propensities rather than "yes or no" answers.

The device that implements these methods will have a light generating and sensing capability, using single (monochromatic) or multiple (polychromatic) light sources of different frequencies (and their corresponding wavelengths) and correspondingly wavelength-sensitive light sensors that are highly responsive to both rotational and translational movement. When a finger action controlling the motion of the device changes that motion by even a minimal amount of translation and/or rotation, the motion sensing device containing these sources and sensors will rotate and translate by a correspondingly small degree over its position on a reference surface or desktop and generate the changes in the image frame corresponding to the motion of that region of the surface or desktop relative to the device. The changes will then be expressed as a decomposition into a translational and rotational part, where the translational part is linear in the motion of the device and the rotational part is non-linear. This additional motional information provided by the decomposition, can then be converted into new and independent motional manipulation capabilities of a graphically displayed object. This capability is usually omitted by devices in the conventional art, such as a conventional optical mouse, which provides its user only 2D (2-dimensional) translational motion vector sensing capability.

Even with all of the sensitivity provided by the optical and mathematical methods implemented by the device, it is expected that on occasion it may be beneficial to examine SQUAL and dpi parameters and use them as metrics to adjust the frame rate of the sensor, and select clusters with more or fewer objects or at greater or lesser distances from the rotational pivot point. Thus, the present device will satisfy a demand from the electronic industry and computer industry for a new object navigating device, in the form of either a new optical mouse, or a game console with equivalent capabilities, that provides both translational and rotational motion vectors, or even more, based on the subtle movement caused by finger gestures. It is important to realize that measurement of the motion of physical objects on a surface by measuring changes in their pixel representation will introduce both effects due to their actual physical motion and optical artifacts that result from the imperfect nature of measurements of the changes in their pixel locations. We will therefore give a brief presentation to indicate the roles of the physical and optical effects. We note, however, that this presentation is an attempt to clarify these effects, and their understanding should be considered only as background for the methods to be described below.

An image sensor used by the optical mouse is constructed to include a plurality of pixels. Hence, after a complete image capturing process (eg. a shutter opening and closing), we can denote the respective pixel data by I(x, y, t). The sensor also has a motion vector (velocity) $\dot{m}$, which is denoted as $$\dot{m}=[x,y]^T \tag{2}$$

Thus, we have $$v_m = \dot{m} = [v_x, v_y] = \begin{bmatrix} dx/dt \\ dy/dt \end{bmatrix} \tag{3}$$

Assume $\dot{m}$ is unchanged in the interval dt, that is, $$I((x+v_x dt),(y+v_y dt,t+dt)=I(x,y,t) \tag{4}$$

If the illumination condition of the mouse lighting system (e.g. LED) changes with x, y, and t in a very smooth way, the device engineer can expand Equ. (4) by Taylor series:

$$I(x, y, t) + \frac{\partial I}{\partial x}v_x dt + \frac{\partial I}{\partial y}v_y dt + \frac{\partial I}{\partial t}dt + H.O.T = I(x, y, t) \tag{5}$$

Where the H.O.T. stands for the higher order term(s), e.g.

$$\frac{d^2}{dt^2}$$

terms.

Since the brightness of the targeted surface has not changed, we have $$\frac{\partial I}{\partial x}v_x + \frac{\partial I}{\partial y}v_y + \frac{\partial I}{\partial t} = 0 \tag{6}$$

In a differential geometry formulation, equation (6) is written:

$$\nabla I \cdot v_m + \frac{\partial I}{\partial t} = 0 \tag{7}$$

Where $$\nabla I = \left[\frac{\delta I}{\delta x}, \frac{\delta I}{\delta y}\right]^T$$

is the image gradient at pixel [x, y].

Eq. (7) is the optical flow constraint equation. In order to derive the motion vector data needed for cursor maneuvering (namely, the velocity ($v_x$, $v_y$)), one may, for example, use the well known Horn-Schunck's method to analyze the velocity vector in the pixel frame of the presently disclosed device. Horn-Schunck's method deals with several phenomena commonly seen by the prior art. In a previous paragraph, the presently disclosed method cited a parameter SQUAL, which has to do with the roughness of the targeted surface. Hence, SQUAL can influence the velocity of the pixels in said pixel frame. So we denote the "deviation" of a targeted surface from its expected smoothness condition by the following equation.

$$e_s = \int\int (\|\nabla v_x\|^2 + \|\nabla v_y\|^2)dxdy \tag{8}$$

$$= \int\int \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 dxdy \tag{9}$$

Note that SQUAL not only has to do with surface roughness, but also its optical condition (e.g. the SQUAL number of a paper having a white color is different than that of a paper in vanilla color, etc.). Thus, using a parameter $e_c$, the "deviation" caused by the optical artifacts can be expressed as:

$$e_c = \int\int \left(\nabla I \cdot v_m + \frac{\delta I}{\delta t}\right) dx\, dy \tag{10}$$

In practice, a high performance optical mouse would desire to minimize $e_s$ and $e_c$. So we can monitor their combined value, i.e., $$e = e_c + \lambda e_s \tag{11}$$

$$\int\int \left(\nabla I \cdot v_m + \frac{\delta I}{\delta t}\right)^2 + \lambda(\|\nabla v_x\|^2 + \|\nabla v_y\|^2) dx\, dy \tag{12}$$

For any pixel (i, j) in an image sensor formed in grid manner, its 4-neighboring pixels are (i−1, j), (i+1, j), (i, j−1), and (i, j+1). So the smoothness data $e_s$, in a discrete way of depiction, can be denoted by s(i, j), i.e., $$s(i, j) = \frac{1}{4}[[v_x(i, j) - v_x(i-1, j)]^2 + [v_x(i+1, j) - v_x(i, j)]^2 + [ \tag{13}$$

$$v_x(i, j+1) - vxi, j2 + vxi, j - 12 + vyi, j - vyi - 1, j2 + vyi + 1,$$

$$j - vyi, j2 + vyi, j + 1 - vyi, j2 + vyi, j - vyi[-1], j - 12$$

As for the optical term, its associated data in discrete format is $$c(i, j) = \left[\frac{\partial I}{\partial x} v_x(i, j) + \frac{\partial I}{\partial y} v_y(i, j) + \frac{\partial I}{\partial t}\right]^2 \tag{14}$$

we put $E = s(i, j) + c(i, j)$ \hfill (15)

A high performance optical mouse would like to get its E value as low as possible (seek the minimized value of E), i.e., $$\min E = \sum_i \sum_j [c(i, j) + \lambda s(i, j)]$$

where $\lambda$, is a weighting factor. To calculate its derivatives, we have:

$$\frac{\partial E}{\partial v_x} = \tag{16}$$

$$2\left(\frac{\partial I}{\partial x} v_x(i, j) + \frac{\partial I}{\partial y} v_y(i, j) + \frac{\partial I}{\partial t}\right)\frac{\partial I}{\partial x} + 2\lambda(v_x(i, j) - (\overline{v_x}(i, j)) = 0$$

$$\frac{\partial E}{\partial v_y} = \tag{17}$$

$$2\left(\frac{\partial I}{\partial x} v_x(i, j) + \frac{\partial I}{\partial y} v_y(i, j) + \frac{\partial I}{\partial t}\right)\frac{\partial I}{\partial x} + 2\lambda(v_y(i, j) - (\overline{v_y}(i, j)) = 0$$

Where $\overline{v_x}$ and $\overline{v_y}$, are the local average value of $v_x$ and $v_y$. So, we write:

$$\left[\lambda + \left(\frac{\partial I}{\partial x}\right)^2\right] v_x + \frac{\partial I}{\partial x}\frac{\partial I}{\partial y} v_y = \lambda \overline{v_x} - \frac{\partial I}{\partial x}\frac{\partial I}{\partial t} \tag{18}$$

$$\frac{\partial I}{\partial x}\frac{\partial I}{\partial y} v_x + \left[\lambda + \left(\frac{\partial I}{\partial y}\right)^2\right] v_y = \lambda \overline{v_y} - \frac{\partial I}{\partial x}\frac{\partial I}{\partial t} \tag{19}$$

Equations (18) and (19) suggest that the motion vector ($v_x$, $v_y$) can be continually updated by lighting condition, this is one of the core concepts of the present disclosure. For a series of images taken by the presently disclosed cursor maneuvering device, the motion vector of a pixel ($v_x$, $v_y$) is adjusted timely, following the following two equations.

$$v_x^{k+1} = \overline{v_x^k} - \frac{\left[\left(\frac{\partial I}{\partial x}\right)\overline{v_x^k} + \left(\frac{\partial I}{\partial y}\right)\overline{v_y^k} + \frac{\partial I}{\partial t}\right]\frac{\partial I}{\partial x}}{\lambda + \left(\frac{\partial I}{\partial x}\right)^2 + \left(\frac{\partial I}{\partial y}\right)^2} \tag{20}$$

$$v_y^{k+1} = \overline{v_y^k} - \frac{\left[\left(\frac{\partial I}{\partial x}\right)\overline{v_x^k} + \left(\frac{\partial I}{\partial y}\right)\overline{v_y^k} + \frac{\partial I}{\partial t}\right]\frac{\partial I}{\partial y}}{\lambda + \left(\frac{\partial I}{\partial x}\right)^2 + \left(\frac{\partial I}{\partial y}\right)^2} \tag{21}$$

Where k denotes the $k^{th}$ image, and k+1 denotes the $k+1^{th}$ image captured by the presently disclosed cursor maneuvering device.

Eq. (20) and (21) tell us the following.
1. The velocity of a pixel in the image frame is the outcome of two phenomena, the motion of object, and optical flow of the pixels representing the object.
2. Because it is subjected to several effects (e.g. motion and optical flow), the velocity ($v_x$, $v_y$) of a pixel as measured by the optical mouse is a lumped one, which comprises both the translational and rotational ingredients concurrently (i.e. $\vec{V_{lumped}} = \vec{V_T} + \vec{V_R}$).
3. Prior art has no effective means to extract $\vec{V_T}$ or $\vec{V_R}$ from $\vec{V_{lumped}}$
4. In the present disclosure, the translational and rotational velocity may further be divided into linear and non-linear terms (i.e. high order terms, H.O.T.).
5. In the present disclosure, we denote the high order terms (H.O.T.) are associated with the gestural behavior of the operator. As has been explained in the above, the differential geometry means used by conventional art pose significant difficulty for the device engineer to decompose a velocity vector into two, i.e., the translational and rotational terms $\vec{V_{lumped}} = \vec{V_T} + \vec{V_R}$. The present disclosure uses topological means to address this problem.

In the art of pattern recognition, to which the optical mouse and its operation are related, there are essentially two methods by which digital images are compared: metric analysis and topological (or geometrical) analysis. The block matching algorithm, BMA, is a metric method that evaluates the relative distance between pixels in images being compared. In the prior art, the typical cursor maneuvering devices use BMA analysis for digital image comparisons.

Unlike metrical analysis methods, topological (or geometrical) analysis methods are not based on measured distances between pixel locations, they are based on the analysis of topological or geometrical relationships between those clusters of pixels being compared. Henceforth we will use "topological" rather than "geometrical" to denote the distinction in methods of analysis.

The present method will integrate the metrical and topological approaches by metrically measuring relative distances between pixels in successive image frames and also using "pseudo-circles" as frameworks on which to cluster pixels so that topological relationships between their clusterings on successive positions of the pseudo-circles can be compared and further analysis carried out. Using this integration of the metrical and topological methodologies, rotational displacements within successive image frames can be effectively calculated to desired orders of the angular displacements.

To those in the prior arts accustomed to the use of BMA to obtain metric data, geometrical analysis does not appear to be direct. However, topological analysis is quite powerful and it can compensate for the shortcomings of metric methods where rotations are involved. The integration of metric and topological methods in the present disclosure is characterized by their balance, in that the choice of cluster positions is made on pseudo-circles whose centers are invariant points, which only translate. This optimization of the combined roles of metrical and topological analysis allows the method to be used more generally in the field of optical sensing, where the sensor will now be capable of sensing such fine aspects of sensor motion as finger and hand gestures.

Like all methods of calculation, there is a range of optimal effectiveness for the topological analysis method to be disclosed. Topological analysis is usually not an efficient means for measuring the translational displacement of clusters at high accuracy. To cope with this problem, the present disclosure uses the BMA metrical method to calculate the total displacements (i.e., what we will denote the "lumped displacements"). After the lumped displacement data is calculated metrically, the rotational displacement data, including even higher order terms as needed, are determined by topological analysis. We will sometimes use the term "lumped," as in the phrase "lumped displacement data" to indicate that the calculated data have been placed in an indiscriminate and undifferentiated group, which treats all data alike without regard for the particulars of their origin. However, although the displacement data calculated by use of the BMA method comprises both linear and non-linear terms, they will eventually be identified with translational and rotational components. Note that BMA is not the only means of calculation that can be used. There are other ways to calculate the "lumped" displacement data from the sensor images, for example, using comparator circuits to compare the intensity value of the pixels selected from different pixel blocks.

In the future, there will be many applications and devices that can benefit from the 3D methodologies described herein. For example, US Patent Application No. 20130002555 cited above as prior art and fully incorporated herein by reference, teaches a cursor maneuvering device and method associated using fingerprint image data. The presently disclosed methodology can further escalate the functionality of such a device by providing the rotational motion vector. Hence, when the presently disclosed method is implemented on an optical touch sensing pad designed based on US 20130002555, the entire system becomes a 2D-3D system (i.e. the fingerprint reading device is a 2D device, the object to be maneuvered is a 3D one). As a result of the present bridging work between metric and topological analysis, many electronics devices requiring finger/hand gestural sensing capability can find way to utilize the presently disclosed method.

In short, the method of the present disclosure provides many possibilities for the disclosed device, as a highly sensitive maneuvering or gesture sensing device, to explore multiple applications. Even though some as yet unanticipated device may use the presently disclosed methods for purposes not directly associated with computer cursor maneuvering (e.g. video game control, home appliance control, etc.), the spirit of using the present device and method has not gone beyond its scope.

BRIEF DESCRIPTION OF THE DRAWINGS

FIG. 5C is a schematic illustration that shows the top view of an exemplary case which deposits multiple color filers on top of the respective pixels of an image sensor being used by the presently disclose method.

FIG. 6A is a schematic illustration that shows an exemplary case that an object casts three shadows on the desktop surface due to there are three light sources in this embodiment (Embodiment 3).

FIG. 6B is a schematic illustration that shows the relative position among the shadows, object, and illuminating sources have been changed after the device of 6A has rotated.

DETAILED DESCRIPTION

The present disclosure provides a navigation device, having a motional (motion detecting) feature, for moving cursors or other graphically generated objects on a display screen. The navigation device is described as being linked to a computer or electronic system, where "linked" refers to communicably linked in the sense that data can be transferred from the device to the computer or electronic system in a form that can be used by the computer or electronic system to enable the performance of its display functionality. The navigation device is suitable for use in next generation computers and other electronic products requiring a display that is both responsive to the gestures of the operator's forgers and can simultaneously and continuously provide both translations and rotations of object images.

Embodiments of the device disclosed herein, which will be called a three-dimensional (3D) optical mouse, will be classified as a single-light-source type or a multiple-light-source type in terms of the methods used by it for image capture. The multiple-light-source type will be further classified as one that uses monochromatic light sources or one that uses polychromatic light sources.

Associated with each of these embodiments, there will be described several mathematical methods that will be implemented to create the corresponding 3D movement of a cursor or other object on a display screen. These mathematical methods are for decomposing the general motion of a multiplicity of targeted objects on a reference plane, such as a desktop, relative to the device, into a translational part and a rotational part. These methods will in turn rely on analyses that enable the comparison of successive image frames captured by the device, expressed as digitized blocks of pixels, so that vector displacements and velocities of the device can be obtained.

Figure 1:
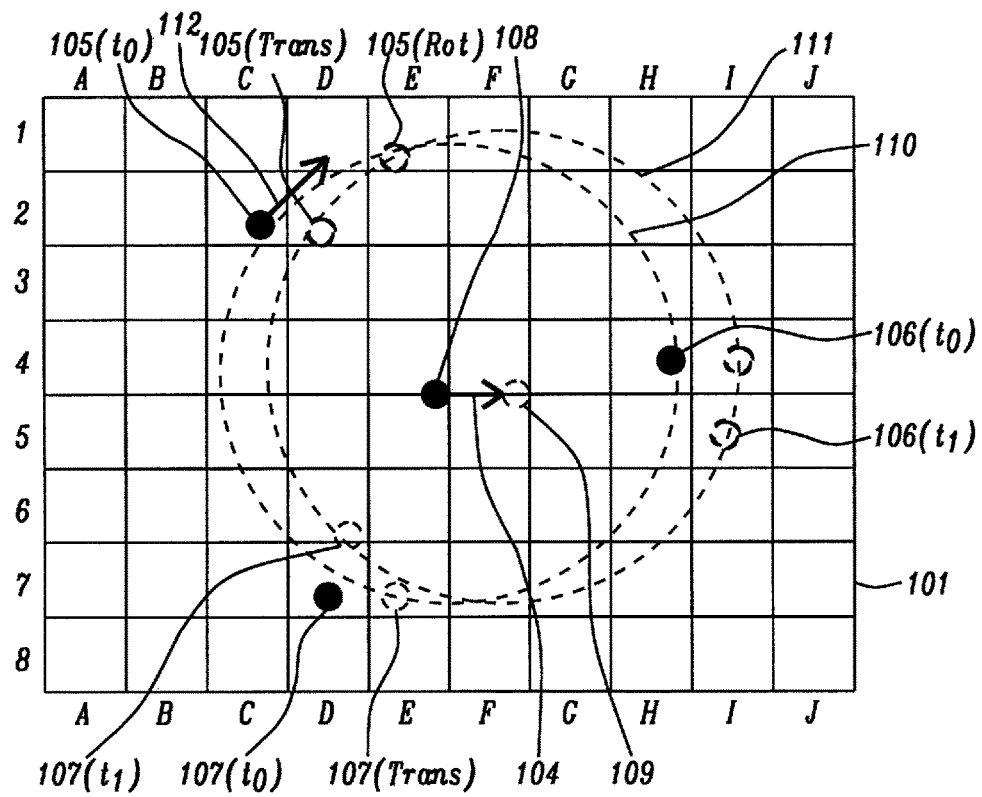
FIG. 1 is a schematic illustration showing how a prior art analysis of the motion of three objects relative to a prior art mouse, assuming only translational displacements, is difficult to comprehend when there is both a translational motion vector and a rotational motion vector.
Figure 2A:
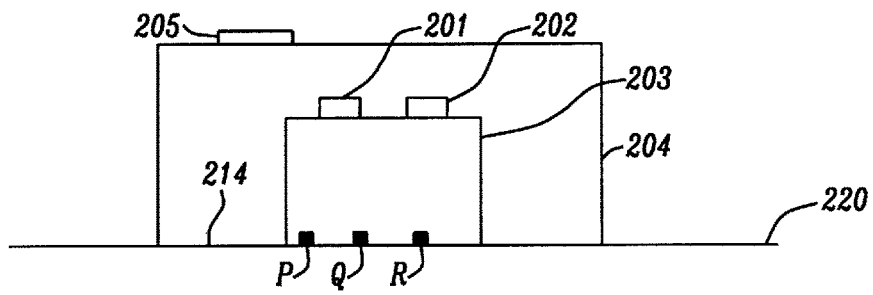
FIG. 2A is a schematic illustration of a single light-source motion detection device that implements the presently disclosed method to create an image frame of multiple objects on a desktop surface.
Figure 4A:
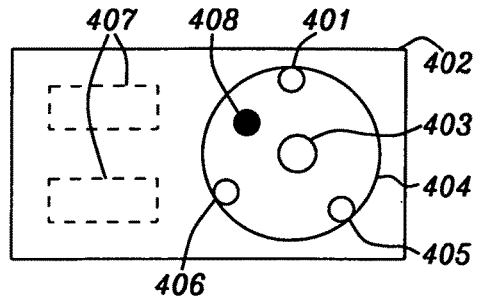
FIG. 4A is a schematic illustration showing an underneath view of an embodiment of the presently disclosed device which accommodates multiple illumination sources.

FIG. 2A schematically depicts a single-light-source type of device. FIG. 4A depicts the multiple-light-source type of device. We will begin with the single-light source device type of FIG. 2A and describe its general structure and its mode of operation. After we have discussed the general operation of both of these devices (FIGS. 2A and 4A), we will describe specific embodiments of their structure and method of use in greater detail.

Referring, then, first to FIG. 2A, there is shown schematically, a side cross-sectional view of one general form of the device of the present disclosure in which a targetable object (or objects) on a reference surface, hereinafter also referred to as a desktop surface 220, will be illuminated by a single light source 202 and followed as the device moves. The phrase "targetable object" is meant to indicate that the object may be a physical object fixed on the desktop, or it may be an optical artifact produced by illuminating the object, such as a shadow, which is still able to be sensed by the sensor. Targetable objects are to be distinguished from "pseudo" objects, specifically "pseudo-circles," which are artificially constructed geometrical (or topological) shapes on which physical objects are clustered, but which cannot be sensed by the sensor.

The device includes a body 204 having a lower surface, 214, and a cavity 203 formed in the body. The cavity has an opening through the lower surface of the body that faces the desktop surface and whose perimeter defines a portion of the desktop surface that will provide the boundaries of an image frame as the device is navigated.

An image sensor 201 capable of capturing an image frame by the opening and closing of a shutter mechanism (not shown) and a light source 202 are mounted within the cavity, shown herein mounted at the upper portion of cavity 203, but other mounting positions are possible. An activation element 205 enables the device to transmit data to the computer display unit. The cavity opening in the body lower surface is positioned over a desktop surface 220 and, in this example, it faces three exemplary targetable objects on the surface, denoted for convenience as fixed point objects P, Q, and R. These objects have no intrinsic structure, and at this particular time they are located on the desktop surface within the opening of the cavity. Note that P, Q and R are all illustrated in the cross-section of FIG. 2A, but they would probably not all be seen in a single plane.

When the surface and its objects P, Q and R is illuminated by light source 202, a series of image frames containing the objects P, Q, and R is captured by the image sensor 201 using the reflected light from P, Q and R. It is assumed that the elapsed time between the formation of successive image frames (i.e. successive shutter openings and closings) is of sufficiently short duration that the same three objects remain within the same image frame as will be shown in FIG. 2B.

While the body of the device 204 is moving, the relative distance between object P and image sensor 201 changes accordingly; the same situation happens for objects Q and R as well. This leads to the displacement of each of the respective objects relative to their old positions in the image frame captured by 201 in FIG. 2B. Referring to schematic FIG. 2B there is shown a representation of two overlapping image frames (two separate successive images shown in a single frame border, no pixel grid being shown for simplicity), in which the initial position of P, Q and R is shown in a first image frame on the circumference of a pseudo-circle 206 having a center C. The change in position of P, Q and R is as though the device 201 had moved slightly to the left as a result of a device velocity $V_T$, 210. Circle 206 is a "pseudo" circle that is used for topological analysis of the motions of the three points, it has no visibility to the sensor. It is shown as having a velocity $V_T$ to the right. Note also that P, Q and R are shown as being equidistant around the circumference of circle 206, but this is not a necessary condition.

The next position of the objects is shown in a second, overlapping image frame, subsequent to the movement of the device. The same objects, in their new positions relative to the device, are now denoted P', Q', and R' and they are shown in schematic FIG. 2B on the circumference of a new ("pseudo") circle 206' having a center C'. It is understood that circle 206 and P, Q and R have now been replaced by circle 206' and the points P', Q' and R'.

Figure 2B:
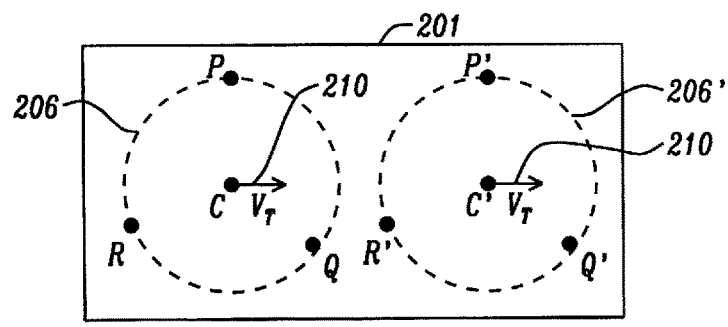
FIG. 2B is a schematic illustration showing the positional displacement in an image frame of multiple objects resulting from the motion of the device depicted in FIG. 2A.

Measuring the positional difference for the captured images of the points in their respective image frames, such as the positional differences between P and P', Q and Q', and R and R', a motion vector $V_T$ can be calculated and one is shown here schematically as an arrow pointing to the right. Note that this motion vector could represent a relative velocity vector (as it now does) or a displacement vector (in which case it would be shown connecting points C and C'), and the two types of vector are related through division by the elapsed time between successive images. It is to be noted that what FIG. 2B depicts (intentionally) is only the translational motion of the three points. There will be occasions, discussed below, in which the body of the motion detection device 204 may rotate, and, along with it, so will device components, such as image sensor 201 and light source 202.

Figure 2C:
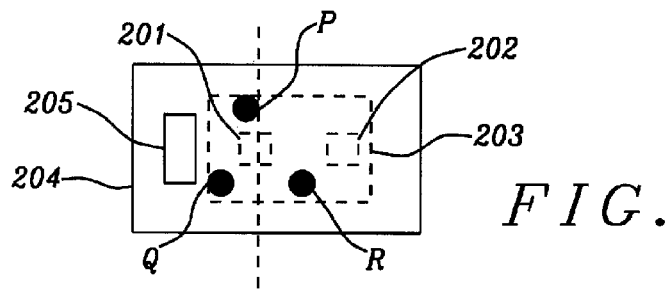
FIG. 2C is a schematic illustration showing the relative positions of the multiple objects, the image sensor and the light source of the device of FIG. 2A before the device executes a rotational motion.
Figure 2D:
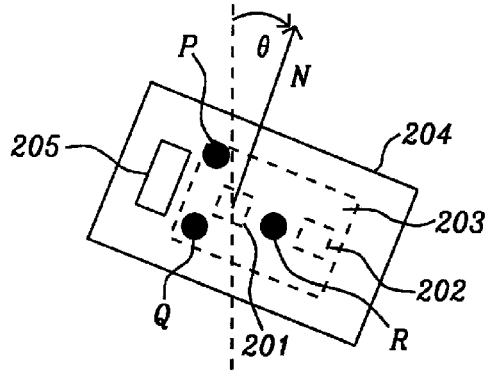
FIG. 2D is a schematic illustration showing the relative positions of the multiple objects, the image sensor and light source of the device of FIG. 2A after the device executes a rotational motion.

Referring now to an underside view of schematics FIG. 2C and FIG. 2D, there is shown, by example, the effects of rotating device 204 clockwise on the desktop, rather than translating it. FIG. 2C shows a schematic underside view of the device 204 positioned over the first position of the three points, P, Q and R before rotation occurs.

Referring next to FIG. 2D, there is shown device 204 rotated relative to its orientation in FIG. 2C clockwise by an angle θ. The rotational angle is shown by means of a normal, N, extending out from sensor 201 perpendicularly to the periphery of the opening of the cavity 203 in the figure plane. Because the three points P, Q and R have now shifted their positions relative to the cavity 203 in the device, they will appear at different positions in an image frame because they are located at new positions relative to image sensor 202.

Figure 2E:
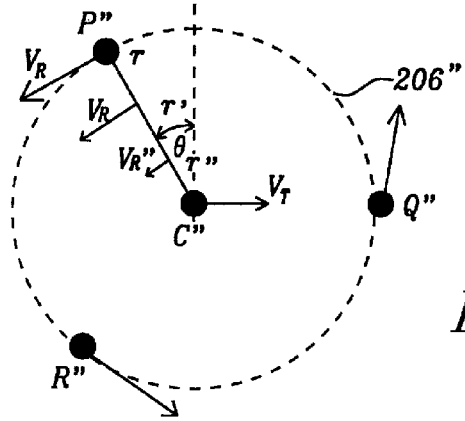
FIG. 2E is a schematic illustration showing the relative motion of the multiple objects, around the circumference of a non-physical "pseudo" circle.

As is now shown in FIG. 2E, points P, Q, and R, located on the circumference of circle 206" for convenience, rotate counterclockwise relative to image sensor 201 around pivot point C" with a tangential velocity, $V_R$, as a result of the clockwise rotational movement of the device. Note also that the rotational motion vector can be superimposed on the translational motion vector $V_T$ of FIG. 2B, (also shown in FIG. 2E), if both types of motion had occurred essentially simultaneously. As FIG. 2E shows, while point P", Q", and R" are rotating around pivot point C" by a vector $V_R$, they might also have the overall translational movement $V_T$ of the entire circle.

In accordance with the geometry, the magnitude of rotational (tangential velocity) motion vector $V_R$ is proportional to r, which is the geometrical distance between the pivot C" and the circumference of the circle on which the respective rotating objects reside. Specifically, as FIG. 2E shows, if the distance between the respective targeted objects (P", Q", R") and C" were changed from r to r' or r", the magnitude of the rotational motion vector would be changed proportionally (i.e. from $V_R$, to $V_R'$ or $V_R"$ for example). Mathematically, equation (22) holds for the relationship between the linear velocity of the point P", denoted $V_R$ and the angular velocity dθ/dt (denoted ω) of the radius, r, connecting P" to C". A similar relationship (not shown in (22)) holds between the displacement of P" along the circumference and the angular displacement, θ of r, with the angle expressed in radians.

$$V_R = r\omega \quad (22)$$

In the prior art, the rotational motion vector, either as a displacement or a velocity, is typically not of interest since its magnitude and direction cannot be easily measured. It is conventionally treated as "noise." In short, in the prior art optical mouse there is no rotational motion, but there is noise. To cope with this measurement "fiction", it is necessary to reduce the amount of actually occurring rotational motion so that it can legitimately be considered as noise. The prior art, therefore, tries to trace only the motion of objects that are located as close to the pivot point C" as possible (i.e. r~0), so that the effects of taking the "noise" data into account inadvertently can be minimized. The present disclosure includes a method to extract the rotational vector from what we call the "lumped motion vector" that would include the effects of both rotational and translational motion. Note we use the phrase "lumped motion vector" because we intentionally put all the data ingredients into an indiscriminate group and then, subsequently, extract the rotational part from the total.

By superposition, the apparent motion vector ($V_{apparent}$) of the targeted points as seen by image sensor 201 is a combined vector (a vector sum) of $V_T$ and $V_R$; specifically as shown in equation (23):

$$V_{apparent} = V_T + V_R \quad (23)$$

where $V_{apparent}$ is the apparent motion vector. Here, we consider $V_T$ to be a linear term, in that it is proportional to (i.e., it is linearly dependent on) the translational motion of the targeted object. The rotational motion vector $V_R$, on the other hand, is considered a non-linear term in the sense that it is independent of (i.e., not linearly dependent on) the translational motion of the device.

It may not be feasible for the device to identify only three objects that are exactly located on a single envisioned circle on the desktop surface and still expect that each one of them deviates from the other by 120 degrees (as exemplary FIG. 2E shows). To cope with this problem, the present method proposes, more generally, to trace the motion of three clusters of objects, each cluster being composed of a multiplicity of individual objects, and each cluster being largely positioned at point P"', Q"', and R"'. Each of the points P"', Q"', and R"' and, therefore, each of the clusters around them, maintains a constant distance r to the pivot point C"' (e.g. r~20 pixels away from pivot point C"' in the image frame).

Today most of the conventional arts use a CMOS image sensor containing thousands of pixels to trace the targeted objects; such a resolution seems to be too low to characterize the rotational movement precisely. Since the present disclosure is intended to form images of clusters of objects, the desired resolution should be higher than that of the conventional art. Based on today's semiconductor manufacturing technology, the resolution of a CMOS image sensor can be easily in the range of millions of pixels, so the above technological requirement should pose no difficulty to the implementation of the present method, although this approach has not been exploited by the conventional art.

Figure 3A:
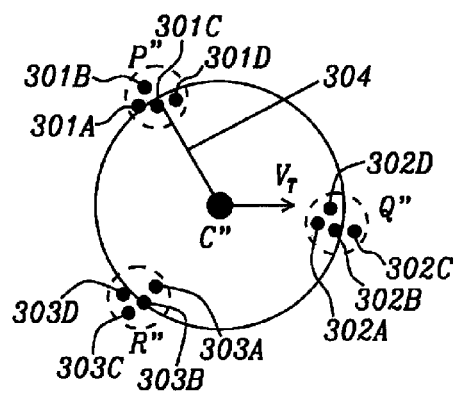
FIG. 3A is a schematic illustration showing multiple object clusters represented as single points P", Q" and R" on the circumference of a non-physical "pseudo" circle C".
Figure 3B:
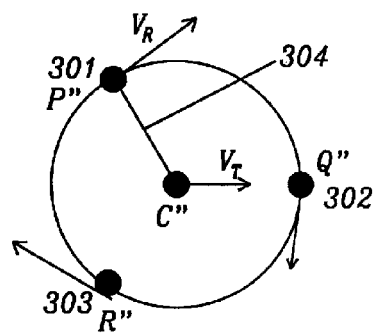
FIG. 3B is a schematic illustration showing the rotation of those object clusters in FIG. 3A in terms of the three single points that represent the clusters.

Referring to schematic FIG. 3A and FIG. 3B, we now explain the mathematical method used to calculate the total displacement vector for clusters of point objects. The method begins by calculating the translational displacement vector. Therefore, physical point objects P"', Q"', and R"' in FIG. 2B (or in any of the FIGS. 2A-2E) will now be generalized in FIG. 3A to represent clusters of objects (i.e.

a quantity of objects in each cluster that is greater than 1). When the individual point objects, P''', Q''' and R''' are hereinafter mentioned, it will be understood that each "point" object is actually a localized cluster of objects on the desktop and is resolvable as such within the image frame. Referring to FIG. 3B, there is shown the three clusters of physical points illustrated as single fictional points, P''', Q''' and R''', where each of these points has a rotational motion vector $V_R$ and a translational vector $V_T$.

Point C''' in FIG. 3A, on the other hand, is a "pseudo" point, a single point that does not represent a real object. It represents the geometric center of the group of three clusters. Displacement vector $V_T$, the translational displacement (or velocity) vector of point C''', is in fact derived from the translational displacement vector of the respective clusters P''', Q''', and R'''. C''' is also the center of pseudo-circle 300.

Finding the translational displacement vector $V_T$ is done as follows. Referring back to FIG. 3A, we have formed three clusters of objects, with each cluster being enclosed in a small dashed circle which is identified with the previous point-object notation, i.e, the clusters enclosed in small circles are now labeled as "points" P''', Q''', and R'''.

Cluster P''' contains the actual point objects 301A, 301B, 301C and 301D. Cluster Q''' contains the actual point objects 302A, 302B, 302C and 302D and cluster R''' contains the actual point objects 303A, 303B, 303C and 303D. We will use these point-clusters for deriving the translation displacement vector.

By taking a series of images in time to indicate the motion of each cluster of objects, the present device is able to calculate three motion vectors for the local geometric centers of the respective clusters (i.e. 301A,B,C,D; 302A,B,C,D and 303A,B,C,D) where these local centers are being labeled collectively as points P''', Q''', and R''' respectively. We now designate the motion (i.e. displacement) vector components for cluster P''' as $(\Delta x_{P'''}, \Delta y_{P'''})$. Concurrently, using the same sensor images taken for cluster P''' (in which the objects of cluster Q''' also appear), one is able, in the same way, to derive the motion vector components for cluster Q''' as $(\Delta x_{Q'''}, \Delta y_{Q'''})$. The same situation applies to cluster R''' (i.e. the pair $(\Delta x_{R'''}, \Delta y_{R'''})$). Note the above motion is the result of a translation and a rotation, therefore the resulting motion vector is the "lumped" sum of a translational motion vector and a rotational motion vector. At this stage, however, we still don't know the values of the separate translational and rotational motion vectors. However, the lumped motion vectors: $(\Delta x_{P'''}, \Delta y_{P'''})$, $(\Delta x_{Q'''}, \Delta y_{Q'''})$, and $(\Delta x_{R'''}, \Delta y_{R'''})$, will have translational components that are equivalent, both in magnitude and direction, because the clustered objects on the desktop surface do not have motions relative to each other. Thus, upon taking the average of the apparent motion vector, as is done below in Equ's (24) and (25), the rotational portions will be canceled out by symmetry, since the three clusters are separated by the same angle on the circle and this angle is fixed during the motion. If this common average value of the translational motion vector were not the same as the translational velocity of the center of the circle, then the point clusters would be moving away from the center of the circle and its shape would not be maintained. Thus, we conclude that there is a common value of the translational motion which must also be the value for the circle center and pivot point, C''':

$$\Delta X_T = \frac{(\Delta x_{P'''} + \Delta x_{Q'''} + \Delta x_{R'''})}{3} \quad (24)$$

$$\Delta Y_T = \frac{(\Delta Y_{P'''} + \Delta Y_{Q'''} + \Delta Y_{R'''})}{3} \quad (25)$$

where $\Delta X_T$ is the translational motion vector in x direction of the pivot point C''', and $\Delta Y_T$ is the translational motion vector in y direction of the pivot point C'''. From equations (24) and (25) we draw the following conclusion: regardless of the rotational movement of the device, which could easily be caused by the smallest human finger gestures in certain cases, the translational motion vector can be derived from the average value of the lumped motion vector; and the result will be quite accurate. Having found the common translational motion vector, we can subtract it from each of the lumped total motion vectors of the separate clusters and obtain the rotational motion vectors of each cluster as shown in FIG. 3B.

We must assume, however, that the geometric centers of each of the clusters P''', Q''', and R''' do not jitter (a result of relative motions within the clusters) in the series of image frames. To suppress this jittering effect, one may:

(1) Increase the number of targeted objects in each cluster;

(2) Adjust the value r for each cluster in accord with practical observations, and then adjust Eq. (24) and (25) by appropriate weighting factors.

Using the above methods, a highly precise translational motion vector will be derived. If one is still seeking higher accuracy, one may recognize that the rotational vector $V_R$ is influenced by the other factors such as r in Eq. (22). Thus, Eq. (23) can be rewritten as:

$$V_{apparent} = V_{linear} + V_{Non-linear} \quad (26)$$

In (26), $V_{apparent}$ is the apparent motion vector (i.e. the lumped motion vector), $V_{Linear}$ is the linear part of the motion vector, and $V_{Non-linear}$ is the non-linear part of the motion vector of the respective clusters of objects (i.e. the clusters within P''', Q''', and R'''). Again, we use the term "linear" to emphasize that a motion vector is proportional to (i.e., linearly dependent on) the translational motion vector of the device itself on the desktop surface. From Eq's. (23) to (26), we changed the description of $V_{apparent}$ because in practical cases, there are various factors (other than just the translation and rotation of the surface points relative to the sensor) that can influence $V_{apparent}$. For example, there are various optical phenomena associated with the way in which pixels in the image frame move that will influence the "apparent" determination of the motion of objects that have been cast in pixel form. $V_R$, merely denotes the rotational vector. For example, we shall see below that the relative positions of a shadow and the object that casts the shadow on the desktop surface will change whenever there is a rotational movement. If the device selects a shadow as the targeted object with which to detect motion, then Equ.(26) would be further modified as $$V_{apparent} = V_{Linear} + V_{Non-linear1} + V_{Non-linear2} + \cdots \quad (27)$$

where $V_{Non-linear1}$ denotes the rotational vector of the object body and $V_{Non-linear2}$ denotes the movement of the shadow of said object which, itself, depends on rotation of the object body because of the rotation of the light source that creates the shadows. If one still takes additional factors into account, then Eq. (27) can be expanded as a series. Thus, Eq. (27) reveals an important fact: the first non-linear term on the right hand side of the equation, $V_{Non-linear1}$ provides the image sensor with rotation vector sensing capability. The second non-linear term, $V_{Non-linear2}$ has to do with such other optical artifacts as changes of shadow position, depth of field or scintillation effects, which often contribute to the content of this term.

In the conventional (prior) art, the rotational motion vector is not a desired quantity since its magnitude and direction cannot be measured easily. To cope with this problem, prior art typically will trace the objects that are located as close to the pivot point C" as possible (i.e. r~0), so that the problem of taking the "noise" data into account inadvertently can be minimized. We recall that the "noise" may, in fact, not be noise at all, but may be the result of rotations.

The present method also traces objects that are not necessarily located near the pivot pinot C", although the objects on or nearby the pivot point C" still can be used for calculating the translational motion vector.

In an image frame, everything is static once the picture is formed; there is no motion in that static picture. The conventional method of deriving a motion vector from a sequence of static pictures is based on the fundamental principle of video technology, which calculates the positional displacements of an object that appears in a series of picture frames (i.e. pixel frames). Thus, the positional displacement of a targeted object ($\Delta X$, $\Delta Y$) can be a function of time. Note carefully that the above stated time will generally be a composite one, which comprises frame rate (e.g. in the units of frames/sec) and camera shutter time ($\mu$sec/pixel exposure time). Therefore, after the elapsed period of time during which image formation occurs, the resulting data ($\Delta X$, $\Delta Y$) will also be a composite, with all the events that that have taken place within the different elapsed time periods having their own impacts on ($\Delta X$, $\Delta Y$)).

For the composite motion vector of an object or cluster of objects, the motion beginning at an particular time $t_0$ and going to some later time t measured from the opening of the shutter at time $t_0$, such as the displacement along the x axis (i.e. the horizontal axis as in FIG. 3D) is a function of the elapsed time, $t-t_0$. Thus the apparent motion vector can be expanded into a Taylor series based on the data acquired at time $t_0$. Considering, as an example, three objects denoted 305, 306 and 307, analogous to the objects in FIG. 3A, we would write for the lumped displacement:

$$\Delta X_{305} = \Delta X_{305,t0} + \frac{\partial}{\partial t}\Delta X_{305,t0}(t-t_0) + \frac{1}{2}\frac{\partial^2}{\partial t^2}\Delta X_{305,t0}(t-t_0)^2 + \ldots \quad (28A)$$

$$\Delta X_{306} = \Delta X_{306,t0} + \frac{\partial}{\partial t}\Delta X_{306,t0}(t-t_0) + \frac{1}{2}\frac{\partial^2}{\partial t^2}\Delta X_{306,t0}(t-t_0)^2 + \ldots \quad (28B)$$

$$\Delta X_{307} = \Delta X_{307,t0} + \frac{\partial}{\partial t}\Delta X_{307,t0}(t-t_0) + \frac{1}{2}\frac{\partial^2}{\partial t^2}\Delta X_{307,t0}(t-t_0)^2 + \ldots \quad (28C)$$

As for $\Delta Y$, the displacement of each object in y axis, similarly, has a lumped motion vector (i.e. apparent motion vector) as $$\Delta Y_{305} = \Delta Y_{305,t0} + \frac{\partial}{\partial t}\Delta Y_{305,t0}(t-t_0) + \frac{1}{2}\frac{\partial^2}{\partial t^2}\Delta Y_{305,t0}(t-t_0)^2 + \ldots \quad (28D)$$

$$\Delta Y_{306} = \Delta Y_{306,t0} + \frac{\partial}{\partial t}\Delta Y_{306,t0}(t-t_0) + \frac{1}{2}\frac{\partial^2}{\partial t^2}\Delta Y_{306,t0}(t-t_0)^2 + \ldots \quad (28E)$$

$$\Delta Y_{307} = \Delta Y_{307,t0} + \frac{\partial}{\partial t}\Delta Y_{307,t0}(t-t_0) + \frac{1}{2}\frac{\partial^2}{\partial t^2}\Delta Y_{307,t0}(t-t_0)^2 + \ldots \quad (28F)$$

Human hands, particularly fingers, are capable of many gestures. When a human hand moves, the present device will sense a motion that may not necessarily be solely translational. There are many factors capable of generating the second or even third term on the right hand side of Eq. (28A) through (28F). Together, these terms provide the contributions of delicate motion vectors of the hand gestures such as jittering, waving, rotation and stroking, that the conventional art does not have the comprehensible knowledge to utilize. Being able to detect and manipulate the respective signals (i.e. variations in the pixel values) in the non-linear regime will make the next generation object navigation device described herein and the operation systems, computer, and electronic devices that use it, much more interactive with their operators.

In conventional art, the mathematical and electronic methods of creating motion pictures and comparing them in a frame-by-frame (and pixel by pixel) manner are associated with the MAD (Mean Absolute Difference) or MSE (Mean Square Error) methodologies, whose formulae are illustrated in the following equations:

$$MAD = \frac{1}{MN}\sum_{i=0}^{M-1}\sum_{j=0}^{N-1}|C_{i,j} - R_{i,j}| \quad (29)$$

$$MSE = \frac{1}{MN}\sum_{i=0}^{M-1}\sum_{j=0}^{N-1}(C_{i,j} - R_{i,j})^2 \quad (30)$$

In (29) and (30), $C_{i,j}$ is the measurable value (e.g. intensity, grey level) of the (i, j) pixel in one image frame. $R_{i,j}$ is the value of the corresponding (i, j) pixel in another image frame to which it is to be compared. M and N denote the resolution of the pixel block used for comparison (i.e. M×N being the total number of pixels in this case). In MAD, it is the absolute differences that furnish the comparisons, in MSE it is the squares of the differences.

In the prior art, the above methods (MAD and MSE) are often referred to as the block matching algorithms (BMA), since they allow comparison between the appearance of an image in two frames. Note that MAD and MSE approach their minimal values when a pixel block containing the C pixels identically matches the pixel block that contains the R pixels. However, the means of determining these pixel blocks can be different, depending on the algorithms used, and the respective MAD and MSE will vary correspondingly. Thus, although the position of an object may be static in a given set of image frames (e.g. there being no movement in successive frames), certain non-linear terms in the motion vector still may arise as artifacts of the calculation methods (i.e. algorithms) used. To illustrate this phenomenon, we will start with the two-dimensional Fourier Transformation, F(u, v) of a discrete function f(x, y), which is the pixel value of an image frame being treated as a discrete function.

$$F(u,v) = \frac{1}{MN}\sum_{x=0}^{M-1}\sum_{y=0}^{N-1}f(x,y)\exp\left(-j2\pi\left(\frac{ux}{M} + \frac{vy}{N}\right)\right) \quad (31)$$

$$f(x,y) = \sum_{u=0}^{M-1}\sum_{v=0}^{N-1}F(u,v)\exp\left(j2\pi\left(\frac{ux}{M} + \frac{vy}{N}\right)\right) \quad (32)$$

In (31) and (32) the discrete function $f(x, y)$ represents the function $f(x_0+a\Delta x, y_0+b\Delta y)$ for a=0, 1, 2, . . . , M−1 and b=0, 1, 2, . . . , N−1 and $x_0$ and $y_0$ are arbitrary initial values of the digitized coordinates. Then, θ(x, y) is the pixel value at each set of coordinates. The sampling increment in the pixel domain (x, y) and the frequency domain (u, v) are related by $$\Delta u = \frac{1}{M \Delta x} \quad (33)$$

$$\Delta v = \frac{1}{N \Delta y} \quad (34)$$

Eq's. (31) through (32) expresses the relationship between a discrete function (i.e. $f(x, y)$) and its Fourier Transformation, i.e. F(u, v). To measure the motion vector of the same object in two image frames, one has to compare the locations of the same object in the two corresponding pixel frames. We may use the known methods of pattern recognition, speckle tracing, or pixel block matching to derive the motion vectors (e.g. ΔX and ΔY). On the other hand, as a result of various optical artifacts, even the same object may generate slightly different images in the respective pixel frames. In other words, from the optical point of view, the same objects do not generally appear exactly the same (i.e. in grey levels) when they are viewed in different pixel frames. The slight changes of contours, brightness, and other optical factors inherent to the objects are all subject to the effects of rotational movement, variation of illumination conditions, angle of incident light, etc. Because they are affected by these phenomena, as is known in the prior art, the calculated values of ΔX and ΔY are not precise data; they vary as a result of many factors, and as a result, there are usually some errors in the calculation. To trace the origin of these errors, we now use Eq. (35) and (36) to show how effects of movement in the positional pixel frame appear in the frequency frame.

$$f(x, y) \exp\left[\frac{2j\pi(u_0 x + v_0 y)}{N}\right] \Leftrightarrow F(u - u_0, v - v_0) \quad (35)$$

$$f(x - x_0, y - y_0) \Leftrightarrow F(u, v) \exp[-j2\pi(u x_0 + v y_0)/N] \quad (36)$$

As Eq's. (35) and (36) show, when an object is translated in the pixel domain (x, y), the corresponding Fourier Transform (i.e. $F(u-u_0, v-v_0)$) undergoes a corresponding translational movement in frequency domain (u, v). In Eqs. (35) and (36), we have let M=N, so a single parameter N denotes the length of one edge of the image frame. This simplification will not affect the general results as stated.

A similar situation occurs with respect to the rotational movement. We will change the coordinate system to polar coordinates in order to illustrate this phenomenon. We let $$x = r \cos θ, y = r \sin θ, u = ω \cos φ, v = ω \sin φ \quad (37)$$

Thus, $f(x, y)$ and F(u, v) can be converted to $f(r, θ)$ and F(ω, φ).
When we put Eq. (37) into Eq. (35) and (36) we find that $$f(r, θ+θ_0) \Leftrightarrow F(ω, φ+θ_0) \quad (38)$$

Equ. (38) means that when a function (e.g. data in a pixel array) is moved by a rotational angle $θ_0$, its Fourier transform will be moved by the same rotational angle $θ_0$ in frequency domain. This phenomenon provides the fundamental rules by which the present device can extract motion vectors. The error associated with whatever algorithm is used thus can be addressed.

To begin the task of extracting displacement vectors from pixel images, we must first know that conventional art performs motion detections by raster scanning the targeted pixel blocks. This method is in effect the application of an algorithm that searches for the objects in the frequency domain that have undergone a translational shift (i.e. similar to what Eqs (35) and (36) describe). Specifically, whenever searching for an object in successive pixel frames, conventional art will generally raster scan the respective data blocks in the memory unit. To do this, requires that the intensity of pixel data be converted to digital data and stored as an array in the memory of the present device. The best matching condition results when two memory blocks yield a satisfactorily low MAD or MSE.

As has been said, the above described process is effectively shifting an object in an image frame by a translational motion vector (i.e. (ΔX, ΔY)). According to Eq. (35) and (36), after performing a Fourier Transformation, the new data set is like the original data set, but shifted by a translational motion vector. Since no other errors would be produced by the method (i.e. by shifting the pixel blocks), theoretically, two closely matching pixel blocks should yield very low values of MAD and MSE. We thus understand that raster scanning an image frame (or a corresponding pixel block) in such a way would provide the minimal calculation error for translational motion vector measurement (i.e. MAD or MSE→0). This, then, is the fundamental reason why prior art desires to provide the translational motion vector but not the rotational ones. If motional detection is limited to translations, then a confident conclusion can be drawn that the correct set of objects has been chosen and that their motion has been determined.

Characterizing rotational movement is different. Slightly careless data processing may lead to a large calculation error. This can be explained by the Fourier transformation process again. According to equation (37), an object that has been rotated in the pixel domain will have its corresponding data in frequency domain also rotated by the same angle. Unfortunately, the object searching method used by prior art is still raster scanning (i.e. applying BMA in the pixel domain). But this is like using a Cartesian coordinate system in which to represent an object that is only to be moved by a rotational motion vector. The coordinate system is poorly matched to the motion being described and, therefore, will produce a description that is extremely complex. Thus, it is not surprising that the conventional method (i.e. block matching algorithm, raster scanning in pixel domain, etc.) cannot yield low MAD or MSE whenever the object has a rotational movement. Thus, in the prior art, limiting the motion identification to translation, the BMAs can produce a confident conclusion that the correct images have been identified and followed.

One may find that the use of a Cartesian coordinate system to trace the rotational movement of an object creates a loss of accuracy associated with rθ (i.e. r denotes the distance between the object and the pivot point, and θ denotes the rotational angle, respectively). Thus, for the same angular displacement θ, the resulting positional displacement of the respective pixels of a rotating object (in pixel domain) can be increased with the increased value of r. In the frequency domain, this means that high frequency data are prone to generate more errors (on motion vector data). We refer back to the Fourier series and envision that the DC term (i.e. zero frequency) is most accurate for the use of deriving translational motion vectors. As for the AC terms (i.e. frequency not zero), the calculation error in the conventional art increases with increasing frequency. Here the AC terms will denote the pattern or shape of the object (e.g. serif of text, edges, and corners of square, surface roughness). On the other hand, the AC terms can also be associated with noise. So the device user faces the following dilemma. When an object is rotating, the device user desires to use some of the AC terms to recognize the object from its shape; but the device engineer also desires to remove the AC terms that are associated with noise. In most situations, the device engineer really doesn't know which of the AC term(s) is (are) the best for identifying the rotating objects and which are the noise. Hence, solely relying on MAD or MSE as a means to locate a rotating object in a series of image frames may easily lead to a soaring calculation load in the prior art, and the search result is by no means guaranteed when the value of MAD or MSE is not convergent.

Thus, it is evident now that this issue should be addressed by alternative means such as fuzzy logic or neural functions. In fuzzy logic, the outcome of a situation is decided by its propensity to happen, a characteristic that is similar to probability. The present disclosure thus provides a possible parameter for deciding whether two sets of pixels are describing the same object when that object is rotating:

$$\frac{MAD}{MAD + \text{noise\_level}}, \text{ or } \frac{MSE}{MSE + \text{noise\_level}} \tag{39}$$

The expressions in Eq. (39) denotes the probability of mistaking two objects lying in two different pixel blocks as being the same object. If MAD=0, then, regardless of the noise level, $$\frac{MAD}{MAD + \text{noise\_level}}$$

is always zero, which means that the probability of mistaking two different objects as the same one is zero because one can always find the object (i.e. MAD=0; there is no difference between the two pixel blocks being compared) in whatever noise level exists. On the other hand, if the noise level of Eq. (39) is very high, then, regardless of the value of MAD, the term $$\frac{MAD}{MAD + \text{noise\_level}}$$

is always very low, and this denotes an extreme situation in which the object(s) simply cannot be identified. In essence, the objects in the image frame have been smeared out to such a degree by the noise that nothing is left to be mistaken.

In practice, the performance of the conventional optical mouse lies between the above two extremes, i.e. MAD>0, and noise level is not low. Similarly, as in the prior art, the initial motion vector derived using the present device is not a perfect one, as it is described by both translational and rotational motion vectors, as well as errors. And it should be noted that this imperfectly described motion vector is a generic problem, but not necessarily a problem to the present device.

What differentiates the present device and the present method from the conventional prior art device and its method, is that the present method and device uses topological (e.g. as described in FIG. 3A) means and optical means (Embodiment 2) to address the nonlinear terms in Eqs.(28A) through (28F). As FIG. 3A shows, the present disclosure uses multiple clusters of multiple objects for motion detection. Since the objects within each cluster are not greatly separated, and because the numbers of objects within each cluster is not large, the respective MAD or MSE will be confined within a small range. In addition, the noise level is also controlled by not taking the high frequency terms into account (i.e. the effective r of each cluster is small). These advantages greatly alleviate ,the calculation burden on the algorithm used for finding MAD or MSE, which in turn enhances the accuracy of the method. As a result, the present device and its method of use can be easily adapted to various kinds of applications, including the use of different algorithms, different fuzzy logic functions, different image capturing means and different game console controlling methods.

In short, the present disclosure addresses the problem of dealing with non-linear terms faced by the conventional art by using the DC term and AC terms intelligently (i.e. applying further geometrical/topological rules to the motion vectors derived). Thus benefitting from the combined application of topological means and optical means, from low order to high order (i.e. terms in Eq. (28A) through (28F)), the present device and its method of use can identify different types of motion vectors (e.g. rotation, shadow movement, etc.).

In the following description of Embodiment 1, various ways of using the non-linear term(s) to achieve the desired sensitivity to different kinds of motions are presented. This will enable the present device as well as future object navigation devices to explore many graphical applications and provide the operator with the ability to perform device manipulations (e.g. finger gesture sensing, wrist gesture sensing, etc.) that are presently not available.

Embodiment 1

Embodiment 1 represents a single light-source device and its method of use that enables the rotational motion vector to be extracted from the lumped motion vector. The device is the one illustrated in FIGS. 2A-2E. The method of extracting the rotational motion from the lumped motion will be explained with reference to schematic FIGS. 3A and 3B.

Referring to schematic FIG. 3A, there are shown three clusters of targeted objects on the desktop surface: clusters 301A, 301B, 301C, 301D; 302A, 302B, 302C, 302D; and 303A, 303 B, 303C, 303D, respectively. These clusters are conveniently enclosed in three dashed circles, so they may be treated as composite point-objects. Specifically, the point-objects representing the clusters will be the cluster centers and those centers are denoted P'', Q'' and R''. These centers are considered as being located on the circumference of the larger solid line pseudo-circle 300 whose own center is C''. Thus, the role of each cluster in FIG. 3A is now played by the respective representative single points P'', Q'' and R'', much as though they were actual single points, such as P, Q and R, of FIG. 2B.

Inside cluster P''', four numbered objects 301A, 301B, 301C, and 301D are selected for use in motion detection. Similarly, for cluster Q''', objects 302A, 302B, 302C, and 302D are selected for motion detection use and cluster R'' is composed of object 303A, 303B, 303C, and 303D, that are likewise selected for motion detection.

Clusters 301A, 301B, 301C and 301D, 302A, 302B, 302C and 302D, and 303A, 303B, 303C and 303D and their corresponding centers P''', Q'' and R'' are located on the same imagined circle 300, which has a fixed radial distance 304 to its center, point C". In practice, the numbers of objects in the respective clusters are not necessarily the same, and the rule of thumb is that larger numbers of objects lead to more accurate calculations.

Within each cluster, it is desirable that the objects are located as closely together as possible. But the objects of the different clusters should be far apart. The three clusters in this example are separated from each other by about 120 degrees on the circle. Through a series of image capturing processes using the device sensor (see sensor 202 in FIG. 2A), the present device is able to compute motion vectors, $V_{301A}$, $V_{301B}$, $V_{301C}$ and $V_{310D}$ for all objects in each cluster. Then, using an appropriate algorithm, the device computes the average of the motion vectors of all objects in cluster 301; producing $V_{301}$ the motion vector of cluster 301 as in Equ. (40).

$$V_{301} = \frac{V_{301A} + V_{301B} + V_{301C} + V_{301D}}{4} \quad (40)$$

Here $V_{301}$ denotes the motion vector of cluster 301, $V_{301A}$ denotes the motion vector of object 301A, $V_{301B}$ denotes the motion vector of object 301B, $V_{301C}$ denotes the motion vector of object 301C, and $V_{301D}$ denotes the motion vector of object 301D.

Using the same averaging method, the device calculates the motion vector for the remaining two clusters, which are, respectively, $$V_{302} = \frac{V_{302A} + V_{302B} + V_{302C} + V_{302D}}{4} \quad (41)$$

$$V_{303} = \frac{V_{303A} + V_{303B} + V_{303C} + V_{303D}}{4} \quad (42)$$

where $V_{302}$ denotes the motion vector of cluster 302, $V_{302A}$ denotes the motion vector of object 302A, $V_{302B}$ denotes the motion vector of object 302B, $V_{302C}$ denotes the motion vector of object 302C, and $V_{302D}$ denotes the motion vector of object 302D.

Likewise, $V_{303}$ denotes the motion vector of cluster 303, $V_{303A}$ denotes the motion vector of object 303A, $V_{303B}$ denotes the motion vector of object 303B, $V_{303C}$ denotes the motion vector of object 303C, and $V_{303D}$ denotes the motion vector of object 303D.

The translational motion vector of the geometrical center of cluster 301, 302, and 303 (i.e. point C" in FIG. 3A) thus is the average value of the separate clusters:

$$V_T = \frac{V_{301} + V_{302} + V_{303}}{3} \quad (43)$$

To derive the rotational motion vector, $V_{R, 301}$ (etc.) one calculates the difference between the total motion vectors of each of the respective clusters and $V_T$. Thus, $$V_{R,301} = V_{301} - V_T \quad (44)$$

$$V_{R,302} = V_{302} - V_T \quad (45)$$

$$V_{R,303} = V_{303} - V_T \quad (46)$$

where $V_{R, 301}$, $V_{R, 302}$, and $V_{R, 303}$ are the rotational vectors of clusters 301, 302, and 303, respectively.

Note that the present device does not necessarily have to send the values of $V_{R, 301}$, $V_{R, 302}$, and $V_{R, 303}$ to the computer. An angular displacement vector θ can be derived by $$\theta = \mathrm{Tan}^{-1}\left(\frac{V_{R,301}}{r}\right), \text{ or} \quad (47)$$

$$\theta = \mathrm{Tan}^{-1}\left(\frac{V_{R,302}}{r}\right), \text{ or} \quad (48)$$

$$\theta = \mathrm{Tan}^{-1}\left(\frac{V_{R,303}}{r}\right) \quad (49)$$

The device engineer/operator can designate any one of Equ. (47), (48), or (49) as the formula to be used in deriving the rotational vector (i.e. the angular displacement) of the device. Alternatively, the device engineer may use two or three of said formulas to increase the reliability of the device.

Thus, by these methods, the present device is able to send a data stream consisting of $V_T$ and θ to the system for object navigation use. Alternatively, because it is independent of the translational motion, factor θ can be used for other computer functional purposes such as zoom in (e.g. θ>0) or zoom out (e.g. θ<0), or file open and close. Still further, there may be occasions when the device transmits $V_R$ (e.g. $V_{R, 301}$) instead of θ to the computer. In this case the corresponding cursor or whatever object is in the display device will be capable of certain motions based on the particular algorithm used by the computer. In short, there are many applications that can be developed based on the new use of the rotational vector θ or $V_R$.

As yet another aspect of the method and device, we may find that the device, when used together with fuzzy logic or neural functions, may enable an innovative way of using those fuzzy logic or neural functions to enhance object/cursor navigation technology. As FIG. 2E illustrated, the method of deriving a rotational motion vector is not the same as that of deriving a translational motion vector, which is often done with BMA. To derive a rotational motion vector, the method described herein combines BMA and the concept of fuzzy logics or neural functions. Eqs. (47) through (49) serve these purposes well. Specifically, the θ parameter derived by Eqs. (47) through (49) can denote the "probability" of a particular angular displacement rather than a specific angle through which the object must turn. Thus, when θ is large, the present device may affirm to the computer that there lies a high probability for the object on the display to turn or do something else, and vice versa. This differentiates the present device from the conventional art in a fundamental way—the present device is not merely looking for a precise value of θ as the ultimate goal. Instead, the device may satisfy the requirements of present or future applications that are based on, for example, the outcomes of whatever different fuzzy logic functions or neural functions are used.

Using the basic principles already outlined, one may further develop or modify the present design by, for example, designating the number of clusters to be different than three. Or, the clusters may not necessarily be all located on the same pseudo-circle 300 (e.g. r may vary). Instead, the clusters can be located on an oval orbit or an arbitrary loop (i.e. r≠constant), and the ones that are positioned on a larger r (i.e. greater distance to the pivot point) will be more sensitive to the rotational movement, and the ones that are closer to the pivot point will be less sensitive. These variations of the method all stem from the same design rules of the present device (e.g. as in Embodiment 1).

In yet another aspect of the method, the device may delegate the task of cluster recognition to the computer, in which case certain pixel blocks, or certain image frames as a whole will be transmitted to the computer for use in various applications. Pre- and post-image processing techniques (e.g. contour enhancement) may also be applied using the present device. The disclosed methodology literally opens a new technological terrain for next generation computer/electronic systems to maneuver objects on the displaying device.

Embodiment 2

Embodiment 2 will be understood in conjunction with schematic FIGS. 4A-4E. As shown schematically in an underneath view in FIG. 4A, the device 402 contains multiple light sources (401, 405 and 406) enclosed within a cavity 404. The dashed-line rectangles 407 indicate auxiliary controls on the device that might be used to activate a scrolling function or the like. Preferably, the optical characteristics of the respective lights sources (e.g. color, or specifically, wavelength) will be different. A targetable object, 408, is on the desktop within the periphery of the cavity. The light sources 401, 405 and 406 illuminate the object 408 and the reflected light impinges on sensor 403, which is appropriately sensitive to the optical characteristics of the light sources, i.e. the sensor is a polychromatic sensor.

Figure 4B:
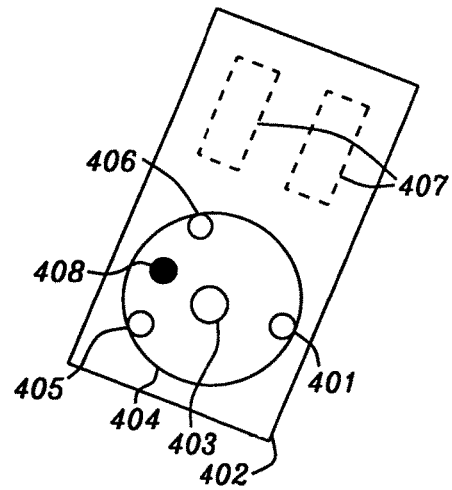
FIG. 4B is a schematic illustration that shows the device of FIG. 4A subsequent to a change in relative position among a targeted object and multiple illuminating sources embedded in the presently disclosed device.
Figure 4C:
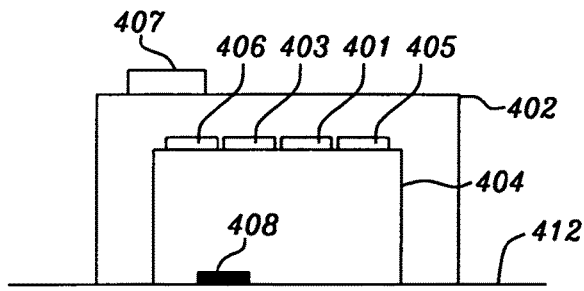
FIG. 4C is a schematic illustration that shows a side cross-sectional view of the device in FIG. 4A.
Figure 4D:
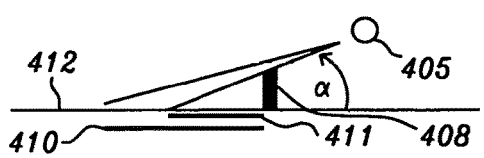
FIG. 4D is a schematic illustration that shows how the length of a shadow cast by an object on the desktop surface is changed by the variation of the incident angle of a single light beam upon rotation of the device.

As shown further in schematic side cross-sectional view of FIG. 4C, the targeted object 408 is positioned on the desktop surface 412. When the body of the device 402 rotates over desktop surface 412, the position of object 408 relative to three light sources 401, 405, and 406, will change.

FIG. 4B shows, schematically, in an underneath view the relative positions of object 408 and the respective light sources 401, 405, 406, after the device 402 rotates relative to its position in FIG. 4A. Comparing FIG. 4B to FIG. 4A, one sees, for example, that the relative position between light source 401 and object 408 has changed.

Figure 4E:
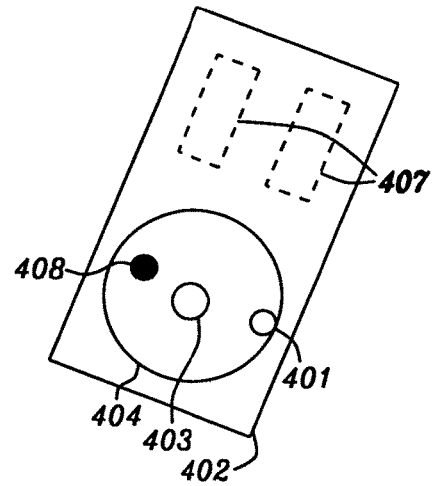
FIG. 4E is a schematic illustration that shows the relative position among a targeted object and single illuminating source embedded in the presently disclosed devices.

In FIG. 4A, light source 401 is the one of the three light sources that is nearest to the object 408. Meanwhile, as FIG. 4B shows, after rotation of the device 402, light source 401 is the one farthest from the object 408 among the three. The consequence of this shift in relative location is depicted in schematic FIG. 4D. When there is a change in the relative distance between object 408 and light source 405, the successive shadows cast by object 408, shown as dark lines 410 and 411, change their length in accord with the angle α created by the light ray and the height of the object 408. The fact that the illumination condition affecting the targetable object may significantly change as a result of the rotational movement of the device is equivalent to saying that the image frames contain background noise. To remedy this problem, the two additional light sources, 405 and 406, are mounted on the top wall of cavity 404 to help illuminate object 408 from correspondingly different directions. The respective performance improvement resulting from the additional light sources can be assessed by comparing FIG. 4B to FIG. 4E. FIG. 4E schematically shows the case where only one light source 401 is used; the illuminating condition on the targeted objects varies dramatically in accord with the rotational angle of the device, as shown in the case of the shadow change in FIG. 4D. To prevent this from happening, as FIG. 4B shows, it is desirable to place multiple light sources in cavity 404.

Note that the spectral performance of the respective light sources (e.g. color, or wavelength range, etc.) of FIG. 4B can be equivalent or different; and the choice may depend on the spectral response of desktop surface 412. In the meantime, the spectral sensitivity of the respective pixels in image sensor 403 may also vary; a good design of an image sensor will enable the removal of undesired non-linear terms as defined in Equ. (28A) through (28F).

To illustrate the method of achieving high performance for the present multi-light source device, we now arbitrarily designate the colors of the three light sources to be red, green, and blue. In addition, image sensor 403 is a color image sensor (polychromatic). The specific color sensitivity of the respective pixels in the image sensor can be explained by reference to schematic FIG. 5A-5C.

Figure 5B:
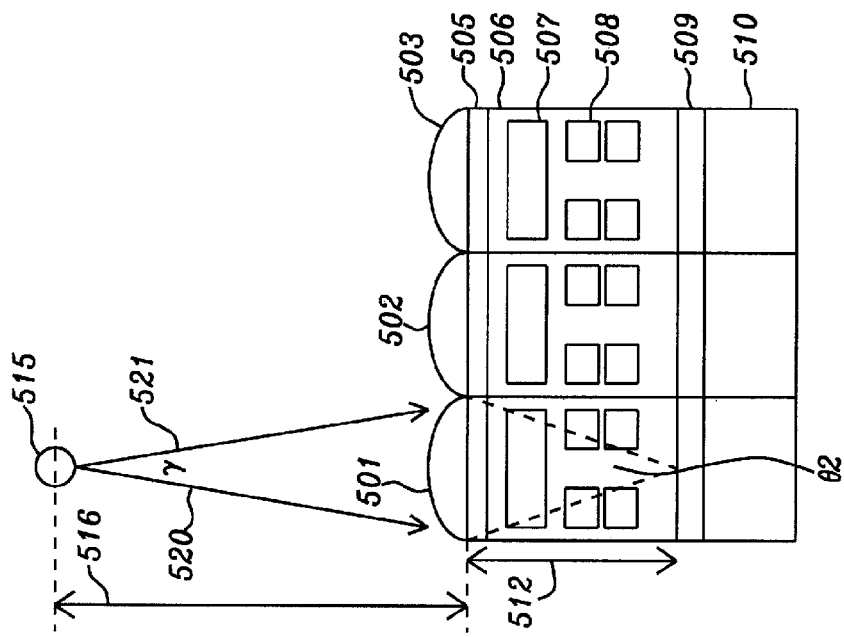
FIG. 5B is a schematic illustration that is a schematic illustration that shows the device structure of the conventional monochromatic image sensor, whose depth of field is lower (compared to that of FIG. 5A) due to lack of color filter.
Figure 5A:
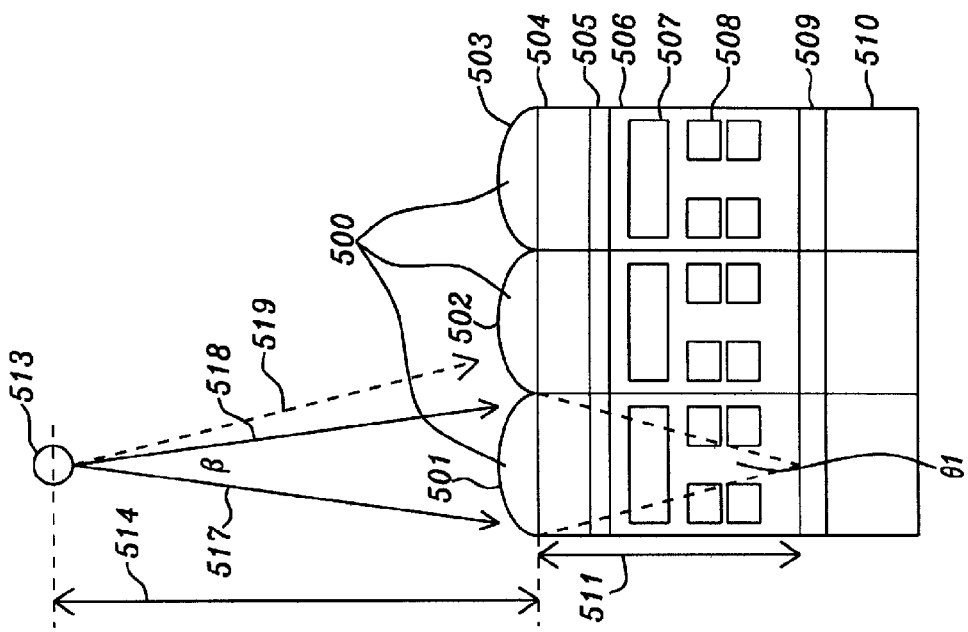
FIG. 5A is a schematic illustration that shows the merit of an embodiment of the present device having an optical sensor whose depth of field is increased by a color filter.

Referring first to FIG. 5A, representative pixels 501, 502, and 503 are sensitive to R (red light), G (green light), and B (blue light), respectively. This sensitivity is also illustrated in FIG. 5C, which shows a matrix arrangement of pixels of the type shown in FIG. 5A. There are many ways in the prior art to make a pixel sensor sensitive to light of a specific color (e.g. ion implantation). Depositing a color filter layer is one of the most common techniques used by today's industry. A cross-sectional portion of a typical semiconductor image sensor is shown schematically in FIGS. 5A and 5B, with FIG. 5B showing three pixels of a monochromatic sensor and FIG. 5A being three pixels of a color sensitive or polychromatic sensor. Note that the two sensors differ from one another by the color filter layer 504, whose absence in FIG. 5B produces the monochromaticity of the pixels because they are then equally sensitive only to the light intensity. The remaining layers (505-510) of the two figures are all respectively identical, as indicated by the same respective numerical labels. When light rays 517 and 518 impinge upon a pixel, they first encounter a micro-lens 500, with three separate micro-lenses being shown as 510, 502 and 503. By a focusing effect of each micro-lens 500, the light rays are converged as one spot on a photodiode 509. For pixels that are coated with a layer of color filter 504 that is directly beneath the micro-lens in FIG. 5A, there are two advantages over the monochromatic ones (i.e. FIG. 5B) that are not so covered. First, the depth of field 514 is extended, second, the immunity of the image sensor to stray light is increased. Specifically, the first advantage has to do with the increased length (i.e. 511) of propagation for the light beam that travels through an IC passivation layer 505, an interconnection scheme (i.e. 507 and 508), and dielectric materials 506. Without the color filter layer, as FIG. 5B shows, the length of light propagation 512 is shortened (compared to 511), henceforth the depth of field 516 is also shortened. Thus, in order to see object 515 clearly, the monochromatic image sensor as is depicted in FIG. 5B will be placed at a distance 516 from object 515, where the distance 516 is less than 514. Having a large depth of field has always been desired by the prior art. The present device uses the above unprecedented method to achieve the goal.

The second merit of this embodiment—stray light cancelation—has to do with the spectral sensitivity of the color filters 504 that are deposited on pixel 501, 502, and 503, respectively. This effect has a significant influence on noise suppression and the sensitivity of the presently invented device to object motions. In FIG. 5A, there is a light source 513 that is emitting light in all directions. To assess its impact on the image sensor, we now select three exemplary light rays 517, 518, and 519 for evaluation. When the color nature (i.e. wavelength) of light source 513 matches that of the color filter in pixel 501 (i.e. red), light rays 517 and 518 pass through the color filter with little impedance. However, stray (not directly impinging on 501) light ray 519 will be absorbed by the color filter of adjacent pixel 502, because that pixel 502 has been designated to have a different color (i.e. Green). Thus, a color sensitive image sensor will naturally be more immune to the stray light, this makes it very effective in detecting/removing the non-linear terms in (Eq.28A) through (Eq.28F).

Embodiment 3

In this embodiment, the color tone (e.g. CIE1931 color index or the like) of a shadow cast by an object on the desktop is used to derive the rotational vectors. The device design concept of embodiment 3 is different than that of embodiment 2. In embodiment 2, the non-linear terms of the motion vector are desired to be removed by the multiple color light sources and color image sensor. In fact, certain non-liner terms also can be utilized to help detect shadows or motions that are associated with the special motions of the objects, and this in turn shall enhance the ultimate performance of the present device.

In this embodiment, as illustrated in schematic FIG. 6A, the basic structure of the device (showing only the cavity structure) resembles that of embodiment 2 (e.g. FIG. 4A). The device cavity, 611, in this example includes on its upper surface multiple color light sources (i.e. 607, 608, and 610) and a color image sensor 609. As FIG. 6A shows, in the present embodiment, the three light sources are mounted on the top wall of cavity 611, where the light sources are separated from one another by the angles $\alpha$, $\beta$, and $\gamma$. In nominal situations, $\alpha \approx \beta \approx \gamma$, but this is not a rigorous requirement and neither is the top wall mounting position. Object 601 is intentionally shown as a cube, so that the role of its facets in shadow formation can be more easily described.

When the device cavity 611 undergoes a rotational movement, the color (i.e. the wavelength of light) of the shadow changes in accordance with the rotational movement of the device and the corresponding movement of the light sources. FIGS. 6A and 6B provides an example. While shadow 602 in FIG. 6A is mainly formed by light source 610, it is also seen that shadow 602 still receives a contribution of light impingement from the other two light sources, 607 and 608. Such variation in color components in the shadows will apply to all the shadows and to all cases of rotational movement. Note that facet 604 of cube 601 in FIG. 6A faces light source 610 directly; after a rotation about axis N, shown in FIG. 6B, facet 604 now faces light source 608 directly. Meanwhile, shadow 612 is now cast by facet 615 and light source 610. The process of changing light impingement during the course of rotational movement is a gradual one. We can envision this process for shadow 602. When shadow 602 is placed at the position as depicted by FIG. 6A, it receives the least amount of light impingement from light source 610. We now denote light source 610 as the first light source. When light source 610 rotates by a small angle, shadow 602 will also move accordingly, thus it will be irradiated by an extra amount of light from one of the two light sources 607 or 608; we denote this light source as the second light source. Meanwhile, the amount of light impinging from the third light source will be reduced (due to shadow 602 moving away from the third light source). Thus, as the device rotates, literally every shadow changes its tint condition (i.e. apparent color) in an immediate and continuous manner.

For example, when a shadow is moved toward a red light source, it will be impinged upon by a greater amount of red light; and, by the same token, this shadow will receive less of an amount of green light when it is moved away from the green light source. By detecting the subtle changes in the intensity of light of different color within the shadows, the present device is able to determine the rotational vectors.

Note that the above described technique of measuring the rotational motion vector by measuring shadow tinting can be done without hindering the process of calculating the translational motion vectors. There is essentially no block matching (BMA) process involved in tint detection, so the translational motion is independently determined. This means that the method and the device are able to provide both translational and rotational motion vectors concurrently and without mutual interference.

Note also that the present device can use the analog signal generated by the measurement of its relative motion to control certain functions in associated applications that are used along with the device. There are many such applications for which triggering an event only requires a fuzzy (i.e., indefinite) signal, which can be easily provided by the tint analysis.

Figure 7:
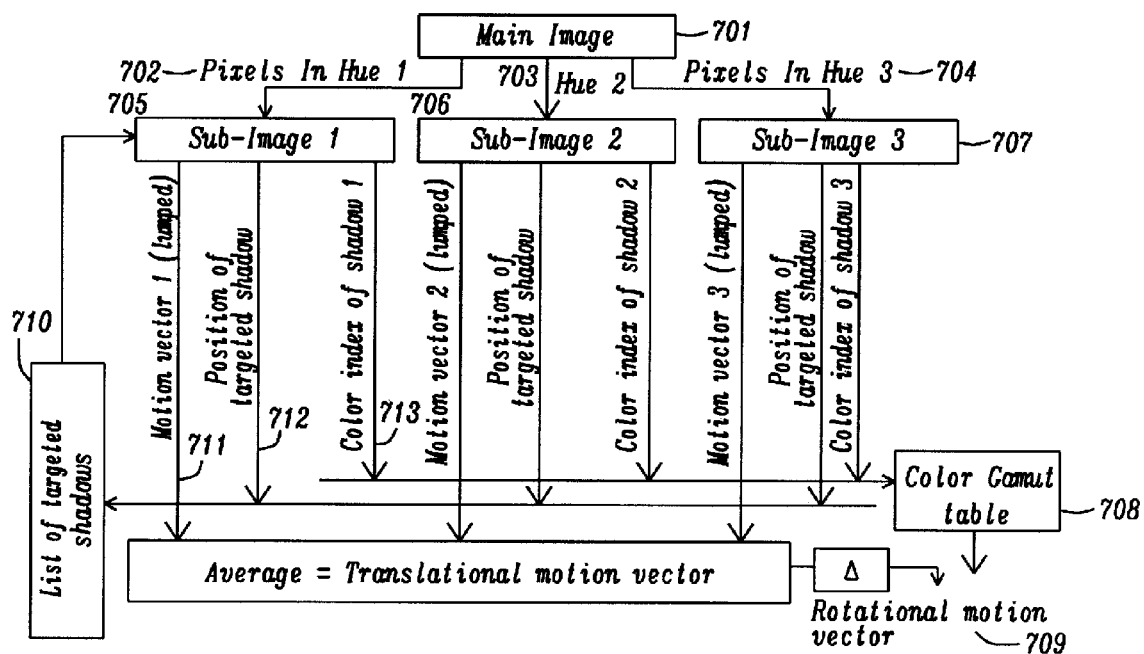
FIG. 7 is a schematic illustration that is an exemplary process flow used for deriving the translational and rotational motion vectors based on multiple sub-images that are fetched from a same color image sensor.

FIG. 7 shows the process flow of the image data provided by the device using the data collected from the separate hues in the image. Each hue produces its own sub-image, shown here as 702, 703 and 704 and each sub-image is separately processed in processing units labeled 705, 706 and 707 using the hue data from the sub-images and the input that separates out the shadow structures 710. Note that the rotational motion vector can be derived (and correspondingly computed in these processing units) in two ways, by making color comparison of the shadows in successive images, or by calculating the high order terms in the translational motion vector, which would normally have been discarded as noise in the prior art.

We note again that the conventional optical mouse can only measure the lumped motion vector. The present device, together with its method of use, takes the lumped data and extracts the non-linear terms so that the translational part of the motion (linear part) and the rotational part (non-linear part) are cleanly separated.

In practice, the selection of the ways of calculating the rotational motion vector depends on the surface condition of the object plane. For example, if the surface is very rough and shadows are many, then calculating the rotational motion vector based on the translation motion vector should be a robust method. On the other hand, when the desktop surface is very flat, but certain particles are seated thereon, then checking the color of the shadow of the dust would be an easier way to determine the rotational motion vector.

Embodiment 4

In a color image frame as is depicted by the polychromatic sensor of FIG. 5A and pixel arrangement of FIG. 5C and as created by the multiple light sources of FIG. 4A, the pixels of different color sensitivities (i.e. red, green, and blue) can be grouped as different colored sub-images (i.e. red sub-image, green sub-image, and blue sub-image). Meanwhile, there are many objects in an image frame that can cast shadows, as is illustrated schematically in FIG. 4D. Together, the shadows and the objects construct a multicolored image from which it can be difficult for the human eye to extract and correlate a specific shadow in the red sub-image frame to another one in the blue sub-image.

Fortunately the device does not really have to do so for every shadow, although it may still do so in certain applications. What the present motion sensing device does, as described in Embodiment 1, is to calculate the lumped motion vector of the targeted object in the respective sub-image(s) (e.g. as is done for multi-hued shadows in FIG. 7) and use it to derive the other motion vectors.

In embodiment 2 (i.e. FIG. 4A), there are three sub-images because the pixels in the image sensor (shown schematically as 403 in FIG. 4A and in more detail in FIG. 5A) are sensitive to three primary colors (i.e. R, G, and B) and a separate sub-image is constructed using each primary color. Dissecting an image frame into its single-color sub-images based on detection of the respective color tones will provide three sub-images. So, the device is able to compare (on a pixel-by-pixel basis) the separate rotational motion vectors associated with the red, blue, and green sub-images. Then, by taking the average value of the lumped motion vector of red, blue, and green sub-images, the non-linear term (the rotational motion vector) may be averaged out and thereby removed from the total motion vector. Thus the translational motion vector alone remains. This is a general method. In practice, the non-linear term of the lumped motion vector is influenced by various kinds of optical artifacts. Shadow is one artifact, but definitely not the only kind of nonlinear term. Thus, there is a need to verify the accuracy of the translational motion vector derived by the above stated calculating method.

For the motion navigation device as is depicted schematically in FIG. 4A, in which the image is described using information provided by three symmetrically placed light sources (401, 405 and 406 in FIG. 4A), group theoretical methods may be applied. A matrix which resembles a representation of the $C_3$ symmetry group may be used to confirm the geographical relation among the respective translational motion vectors. Specifically, the translational motion vectors that are derived from the lumped motion vectors as described in embodiment 1 and 2, comply with equations Eq. (50) through (52) below when the influence of the non-linear term is totally removed. Thus, by, iteration and timely checking, a highly accurate translational motion vector can be derived at all times.

$$C_3 \begin{bmatrix} \Delta X_r \\ \Delta Y_r \end{bmatrix} = \begin{bmatrix} \Delta X_b \\ \Delta Y_b \end{bmatrix}, C_3 = \begin{bmatrix} \cos\left(\frac{2\pi}{3}\right) & -\sin\left(\frac{2\pi}{3}\right) \\ \sin\left(\frac{2\pi}{3}\right) & \cos\left(\frac{2\pi}{3}\right) \end{bmatrix} \quad (50)$$

$$C_3 \begin{bmatrix} \Delta X_b \\ \Delta Y_b \end{bmatrix} = \begin{bmatrix} \Delta X_g \\ \Delta Y_g \end{bmatrix}, C_3 = \begin{bmatrix} \cos\left(\frac{2\pi}{3}\right) & -\sin\left(\frac{2\pi}{3}\right) \\ \sin\left(\frac{2\pi}{3}\right) & \cos\left(\frac{2\pi}{3}\right) \end{bmatrix} \quad (51)$$

$$C_3 \begin{bmatrix} \Delta X_g \\ \Delta Y_g \end{bmatrix} = \begin{bmatrix} \Delta X_r \\ \Delta Y_r \end{bmatrix}, C_3 = \begin{bmatrix} \cos\left(\frac{2\pi}{3}\right) & -\sin\left(\frac{2\pi}{3}\right) \\ \sin\left(\frac{2\pi}{3}\right) & \cos\left(\frac{2\pi}{3}\right) \end{bmatrix} \quad (52)$$

Rotational motion vectors do have similar relationships as the translational ones do. But, as has been stated above, the rotational motion vector is subjected to and displays the influence of more kinds of factors, including illumination effects and the effects of surface roughness. Thus, the device user would face more challenges upon using group theory to identify rotational motion vectors. Above all, Equations (50), (51), and (52) do hold for rotational motion vectors provided noise is not a concern.

Equations (50), (51), and (52) are the generic formulas derived from $C_3$ symmetry. If there are more than three light sources, or if the number of clusters is not three, or if the geometrical position of the light sources is not exactly in the $C_3$ symmetry group, then the device user must modify equation (50) through (52) to fit the specific symmetry situation (e.g. $C_n$). In essence, this embodiment provides a general method to verify/derive the translational and rotational motion vectors with high accuracy, and this method looks into the pixel plane with a geometrical perspective based on symmetry considerations. By analyzing the data derived from the pixel plane using group theory, the present technology (device plus method of analysis) reaches a level of unprecedented accuracy and reliability.

In short, the nonlinear term embedded in the translational motion vector, the term that was caused by the rotational movement and shadows of surface roughness—the ones that were deemed by the prior art to be noise, now can be used to calculate the rotational vectors. Thus, multiple light sources and color image sensors also strengthen the ultimate performance of this disclosure, in a manner that has not been achieved by any prior art before. Applying group theory to an object navigation device (e.g. an optical mouse) has also never been done before.

Embodiment 5

This embodiment demonstrates that the present device can be utilized more generally for the detection of relative motions and for corresponding applications that are more general than cursor maneuvering. We will illustrate this contention using 2D and 3D graphic rendering processes and users of the presently disclosed method can refer to these examples and create their own applications while remaining within the spirit and scope of the method and its implementation.

As is well known by those who practice the art of using computer generated graphics, the basic motional data transferred to the CPU (central processing unit) of the computer by a motion generating and navigational device, such as the one described herein, must be acquired by the GPU (graphical processing unit) of the graphics rendering system in a manner and form that allows movements of the navigational device to be implemented as some corresponding movement of the graphics image generated by the rendering system.

Figure 8:
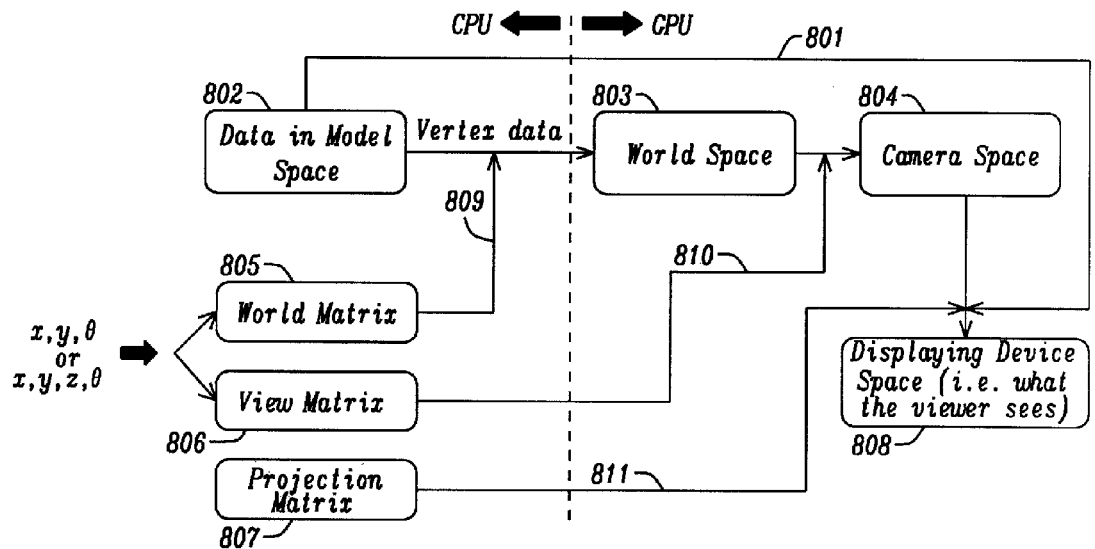
FIG. 8 is a schematic illustration of the data-transferral interface of a graphical rendering system when utilizing the present navigational device.

Referring now to FIG. 8, there is shown in a simplified, schematic block-diagram format the task separation between elements of a CPU of a computer and at least one GPU being used by the computer to provide graphical renderings/motions of various objects. A complete system (CPU+GPU) comprises approximately four "spaces", a model space, a world space, a camera space and a display-device space. From the point of view of the required software code, these four spaces are essentially defined by four blocks of code, which are the programs for implementing system operation. Further, these programs can be characterized as manipulating a "world matrix," (805) "view matrix" (806) and "projection matrix" (807). The data in the model space (802) is the vertex data describing the object being rendered, which corresponds to the manner in which the surface of the object being rendered is dissected into a multiplicity of facets, each of which is identified by the tips of its facet planes. After being updated by the data provided by the world matrix or view matrix, which is transferred to GPU through various data buses (801), (809), (810), (811), the new position of the object in world space is derived and sent to a display device (808) from the camera space (804). Although different commercial graphical rendering systems, e.g. Microsoft Direct 3D™, Nvidia Open GL™, etc., may use different means to calculate the positions of the objects to be rendered and displayed, in general terms their operation as a system can be schematically described as in Prior Art FIG. 8.

Using an exemplary set of instructions as might be found in Microsoft Direct 3D™, one might find that there are mainly three world matrices which provide the updated motion of the object. For example, in the instruction set, one may find the following:

D3DXMatrixTranslation(D3DXMATRIX*pout,
    FLOAT x,FLOAT y,FLOAT z);                        (53A)

D3DXMatrixRotationX(D3DXMATRIX*pOut,
    FLOAT angle)                                     (53B)

D3DXMatrixRotationY(D3DXMATRIX*pOut,
    FLOAT angle)                                     (53C)

D3DXMatrixRotationZ(D3DXMATRIX*pOut,
    FLOAT angle)                                     (53D)

Thus, by providing updated data of x, y, and z (Prefix FLOAT denotes the data are in floating point format), or rotational angle with regard to x-axis, y-axis, or z-axis, the operator is able to move a selected object by translational movement or rotational movement. On the other hand, since the conventional mouse is a 2D device, it does not provide 3D motion vector needed by Eq. 52 A thorough D directly. To derive the parameter z, one would have to resort to FIG. 9, which provides the mathematical relationship between the 2D cursor and "2.5D cursor", where by 2.5D we refer to a cursor movement that might be obtained in the prior art by artificially creating an additional rotational degree of freedom as in FIG. 9.

Figure 9:
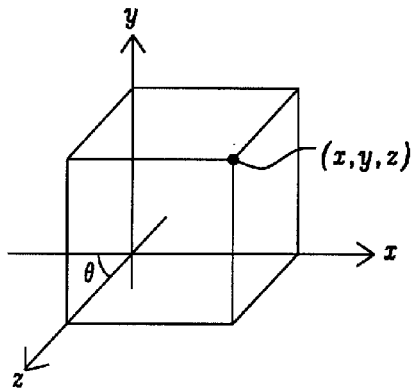
FIG. 9 is a schematic illustration of a single object point lying on a reference cube showing the relationship between a 3D and a 2D representation.

Referring to FIG. 9, there is shown a point that lies on an address of (x, y, z) in a three-dimensional coordinate system, its whereabouts (x', y') in the corresponding 2.5D (projected) coordinate system (not illustrated) complies with formula (54A) and (54B), i.e., $$x'=x-z \cos \theta \quad (54A)$$

$$y'=y-z \sin \theta \quad (54B)$$

In conventional art, the angle $\theta$ in Eq. 54 A and 54B is often a predefined value. Thus, the operator is not able to adjust the z value easily.

Figure 10:
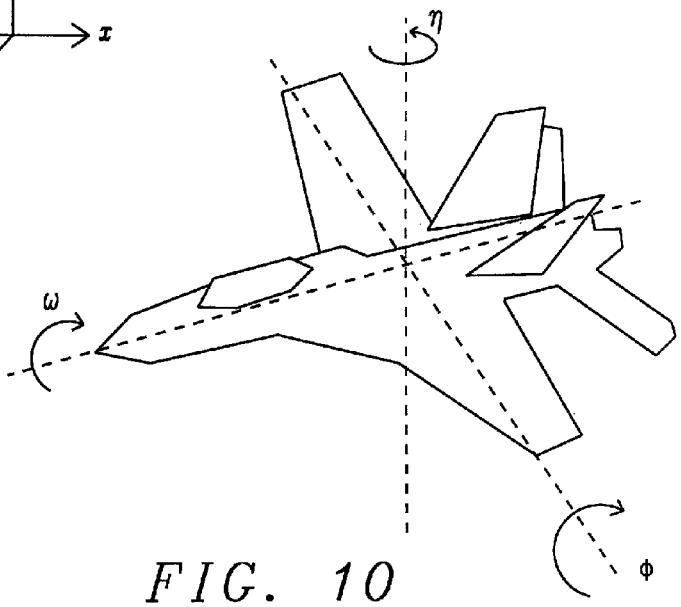
FIG. 10 shows a schematic illustration of an exemplary image (a jet plane) rendered by a 3D graphical system, indicating the rotational degrees of freedom provided by the present navigational device.

FIG. 10 depicts an exemplary model of a jet fighter which is generated by a prior art 3D graphic rendering system such as the one previously described in FIG. 8. In this example, the jet fighter not only has translational movement, but also rotational movement. As discussed above, a conventional 2D mouse cannot easily move an object by translational and rotational motion vectors independently, in that the mouse itself senses only linear motion. The presently disclosed motion sensor, used as a cursor maneuvering device and method of its use, however, provides an effective means for rotating a three-dimensionally rendered object (e.g. the jet fighter of FIG. 10) by angular data (e.g. $\omega$, $\eta$, or $\phi$) while moving the device by a lumped translational motion vector. This capability greatly enhances the interaction between a modern graphic rendering system and the operator. In effect, the operator will have a sense that the jet fighter is hovering in the sky, while its rotational motion is being directly provided by the operator's own hand movements.

Note that the conventional graphic rendering system (i.e. the integrated system of CPU+GPU illustrated in FIG. 8) may still compute some "artificial" rotational angles for themselves, but the performance usually is clumsy, and the overall system functionality will be degraded by the imposition of the extra calculation load.

Referring back to FIG. 8, the world matrix (805), view matrix (807), and projection matrix (807) can be set to only accept an x, and y. By certain software processes as illustrated in Equ. 54A and 54B, a z value can be derived by x', y'($\theta$ is given). The drawback of this method is that it takes up some CPU calculation power, and the angle $\theta$ is not a quantity that can be changed by the interaction with the operator in a direct and timely manner.

As is understood by a person skilled in the art, the present description is illustrative of the present disclosure rather than limiting of the present disclosure. Revisions and modifications may be made to methods, materials, structures and dimensions employed in forming and using a motion sensing, generating and navigation device for controlling and implementing the translational and rotational movement of graphical representations on a computerized graphical display while still forming and providing such a device and its method of use in accord with the spirit and scope of the present disclosure as defined by the appended claims.

What is claimed is:

1. A device for manipulating the position of an object or controlling a function of a computer or electronic system linked to a displaying device, comprising:
    a movable portion positioned against a reference surface over which said movable portion has a relative motion and wherein said reference surface has a plurality of fixed targetable objects thereon;
    a cavity formed in or on said movable portion wherein said cavity has an opening facing a portion of said reference surface wherein said portion includes said targetable objects;
    one and only one optical sensor embedded in said cavity, wherein said optical sensor is a multi-pixel image sensor;
    at least one light source embedded in said cavity;
    said device being configured to create an image frame defined by said one and only one optical sensor which is located within said cavity, wherein said image frame is configured to be electronically represented as a pixel image digitally representing a portion of said reference surface having said multiple targetable objects thereon; wherein said portion of said reference surface is illuminated by light from said at least one light source and whereby said plurality of targetable objects is captured in said pixel image and wherein said plurality of targetable objects is chosen to be in the form of clusters of targetable objects arranged about the periphery of a virtual circle denoted a "pseudo-circle" and wherein the motion of said targetable objects is represented in terms of the motion of said pseudo-circle;
    said device being configured to form a plurality of said pixel images corresponding to said reference surface with said targetable objects thereon, wherein said plurality of images correspond to the relative positions of said movable portion with respect to said reference surface;
    said device being configured to make an image frame comparison, whereby differences between successive images in said plurality of images are compared metrically and/or geometrically using said pseudo-circle as a moving reference system to provide what are denoted lumped motion vectors for said multiple targetable objects corresponding to said changes in said successive images; wherein
    each said lumped motion vector is capable of being decomposed into a translational part and a rotational part.

2. The device of claim 1 wherein said plurality of targetable objects that are selected as clusters of targetable objects to be arranged about said pseudo-circle, are arranged generally uniformly about said pseudo-circle, wherein each cluster has a center that is representable as a single point object and wherein the motion of each said center as obtained from data supplied by successive sensor frames is a lumped motion vector that is the combination of a translational and a rotational motion vector and wherein the averaged data of said lumped motion vectors, calculated in a weighted or non-weighted manner, of each of said centers is a translation motion vector that is used as a common term by said computer or electronics, whereby a subtraction of said translation vector from said lumped motion vector of each of said centers produces said rotational part of said lumped motion vector.

3. The device of claim 1 wherein said plurality of targetable objects have no motion relative to each other on said reference surface during the relative motion of said movable portion.

4. The device of claim 1 wherein said multiple targetable objects comprise optical artifacts such as shadows, scintillations and multi-colored hues that are captured by said at least one optical sensor.

5. The device of claim 1 wherein rotational and translational parts of said lumped motion vector correspond to translational motions and rotational motions of said movable portion relative to said reference surface and are used to provide independent control of translational and rotational motions of said object being manipulated on said display.

6. The device of claim 1 wherein said lumped motion vector is determined metrically using block matching algorithms MAD (mean absolute difference) or MSE (mean square error) or algorithms with equivalent merit, to compare a plurality of image frames digitally representing a motion produced by operation of said device.

7. The device of claim 6 wherein said lumped motion vector(s) has a linear dependence on the translational motion of said movable portion and wherein said lumped motion vector has a rotational component that is identified as a result of a non-linear dependence on the motion of said motion feature.

8. The device of claim 1 wherein a digital representation of said lumped motion vector is Fourier transformed to enable the positional representation of said lumped motion vector to be analyzed in a frequency domain.

9. The device of claim 1 wherein said plurality of individual clusters of objects are arranged along a circumference of a pseudo-circle and wherein a rotational motion vector is computed geometrically based on an angular displacement of said clusters around said circumference.

10. The device of claim 9 wherein a nearly symmetric location of light sources determines a rotational symmetry group whose group representation is utilized to determine said rotational motion vector.

11. The device of claim 1 wherein said targetable objects on said reference surface are shadows and wherein movement of said shadows as said motion feature is moved provides information for computation of a rotational motion vector.

12. The device of claim 11 wherein said shadows are formed by light sources of different wavelengths and wherein movement of said shadows is computed from variations of the relative intensities in the hues of each shadow corresponding to said wavelengths.

13. The device of claim 1 wherein said one and only one optical sensor is a monochromatic optical sensor and said at least one light source is a source of monochromatic light.

14. The device of claim 1 wherein said one and only one optical sensor is a polychromatic sensor that is sensitive to a first plurality of light beams formed by lights of different wavelengths and wherein said at least one light source is a second plurality of monochromatic sources wherein at least one source of said second plurality provides light within said first plurality of optical wavelengths.

15. The device of claim 1 wherein said one and only one optical sensor includes a filter layer that alters its chromatic sensitivity and increases its depth of field.

16. The device of claim 1 wherein pixel comparisons are interpreted using fuzzy logic, wherein said comparisons are satisfied only in a probabilistic sense as being more or less likely to be true.

17. The device of claim 1 wherein said rotational part produces a rotation of a cursor or a graphically generated object on a display screen.

18. The device of claim 1 wherein said rotational part activates a functionality used by said computer or electronic system.

19. The device of claim 1 used as a game controller.

20. The device of claim 1 embedded in a smart phone.

21. The device of claim 1 wherein said pixel images are images of fingerprints.

22. The device of claim 1 being an optical touch pad or being embedded in an optical touch pad.

23. The device of claim 1 wherein said one and only one optical sensor is capable of detecting a gestural movement of a human hand, finger, elbow or arm.

24. A method for moving a graphically generated image on an electronic display screen or switching on or off a function controlled by a computer corresponding to the motion of a device being navigated over a reference surface, comprising:
  providing a reference surface having a plurality of targetable objects thereon;
  providing a pseudo-circle to form a co-moving reference frame about whose periphery selected clusters of said targetable objects are arranged;
  providing a device capable of changing its position relative to said reference surface, wherein said device has a cavity that faces said reference surface via an opening, wherein said device comprises an optical sensor and at least one source of light whose wavelength corresponds to that of a sensitivity of said optical sensor, wherein said device forms a succession of image frames of a portion of said reference surface, whereby within said image frames said targetable objects are traced corresponding to a motion of said device relative to said reference surface;
  determining a lumped motion vector of said targetable objects by comparison of their positions in two successive image frames;
  decomposing said lumped motion vector into a translational component and a rotational component by use of said pseudo-circle;
  communicating said components to said computer or electronic system.

25. The method of claim 24 wherein an image on a display screen linked to said computer or electronic system is translated and rotated in a correspondence with said translational and rotational components respectively.

26. The method of claim 24 wherein said rotational component is used to activate or deactivate a computer functionality or to switch on or off a function of an electronic system.

27. The method of claim 24 wherein said motion of said device includes motions produced by hand and finger gestures of a device operator.

28. The method of claim 24 wherein said lumped motion vector is determined metrically from an arrangement of identifiable clusters of targetable objects positioned around said pseudo-circle.

29. The method of claim 28 wherein said metric determination utilizes a BMA (block matching algorithm).

30. The method of claim 28 wherein, using a geometrical analysis, non-linear terms are extracted from said lumped displacement vector and identified as the rotational part or high order part of said displacement vector.

31. The method of claim 24 wherein said targetable objects include both fixed physical objects and optical artifacts such as shadows, scintillations and multi-colored hues that can be captured by said optical sensor.

32. The method of claim 29 wherein said block matching algorithms comprise MAD (mean absolute difference), MSE (mean square error) methods or methods of equivalent functionality, to metrically compare image frames digitally represented as pixel blocks.

33. The method of claim 24 wherein said translational component has a linear dependence on the relative motion of said device and wherein said rotational component has a non-linear dependence on the relative motion of said device.

34. The method of claim 24 wherein said portion of said reference surface comprises a plurality of individual clusters of said targetable objects and wherein said individual clusters are arranged around a circumference of a pseudo circle and wherein a rotational motion vector is computed based on an angular displacement of said clusters around said circumference.

35. The method of claim 24 wherein a subset of said clusters is chosen to be farther from a rotational center so that an enhanced capability of said device in the determination of a rotational vector is obtained.

36. The method of claim 24 wherein a symmetric location of light sources determines a rotational symmetry group whose group representation is utilized to determine a rotational vector.

37. The method of claim 24 wherein said targetable objects on said reference surface cast shadows and wherein movement of said shadows provides information for computation of a rotational motion vector.

38. The method of claim 24 wherein said one and only one optical sensor is a single monochromatic optical sensor and said at least one light source is a single source of monochromatic light.

39. The method of claim 24 wherein said one and only one optical sensor is a single polychromatic sensor that is sensitive to a first plurality of optical wavelengths and wherein said at least one light source is a second plurality of monochromatic sources wherein at least one source of said second plurality provides light within said first plurality of optical wavelengths.

40. The method of claim 39 wherein said single polychromatic sensor comprises a layer working conjunctionally to increases the depth of field of said polychromatic sensor.

41. The method of claim 24 wherein said rotational motion vectors are interpreted using fuzzy logic, wherein the conditions of said fuzzy logics are satisfied only in a probabilistic sense as being more or less likely to be true.

42. The method of claim 41 wherein said fuzzy logic interpretation is used to trigger a computer action that corresponds to a range of values of a parameter rather than a single value.

43. The method of claim 37 wherein said movement of shadows is interpreted using fuzzy logic, whereby the rotation of an object is asserted to have a certain probability of being within a range of angles.

44. The method of claim 43 wherein said fuzzy logic interpretation is used to trigger a computer action that occurs when a parameter has a certain range of values rather than a single value.

45. The method of claim 28 wherein a positional representation of said lumped- motion vector is Fourier transformed to enable said positional representation to be analyzed in a frequency domain.

46. The method of claim 24 wherein said reference surface is a desktop.

47. A method of motion detection comprising:
   acquiring a first plurality of images wherein each image in said first plurality contains a second plurality of objects;
   grouping said second plurality of objects into discernable clusters and arranging said clusters about the circumferential periphery of a pseudo-circle;
   determining lumped motion vectors for each cluster by analyzing an intensity variation of light cast from said objects and captured within said images;
   determining a common linear motion vector of said clusters of objects as the linear motion vector of the center of the pseudo-circle;
   determining a non-linear motion vector of each of said clusters of objects;
   using data acquired from said linear motion vectors and from said non-linear motion vectors, determining a value or a status of a specific function used by a computer, electronic system or a system of equivalent functionality.

48. A motion detection device comprising:
   an image processing system capable of acquiring a first plurality of images wherein said first plurality of images include a second plurality of objects captured therein;
   wherein said image processing system is capable of grouping said second plurality of objects into a multiplicity of clusters and of arranging said clusters about the circumferential periphery of a pseudo-circle; wherein
   said image processing system is capable of determining a lumped motion vector for each of said multiplicity of clusters using variations of light intensity of light cast by said second plurality of objects within said first plurality of images;
   wherein using said pseudo-circle, said image processing system is further capable of determining a common linear motion vector for said clusters of objects;
   wherein said image processing system is capable of determining non-linear motion vectors for each of said multiplicity of clusters of objects;
   whereby, using data acquired from said common linear motion vector and from said non-linear motion vectors, said image processing system is capable of determining a status or a value of a specific function used by a computer, electronic system or a system of equivalent functionality.

49. A device for manipulating the position of an object or controlling a function of a computer or electronic system linked to a displaying device, comprising:
   a movable portion positioned against a reference surface over which said movable portion has a relative motion and wherein said reference surface has a plurality of fixed targetable objects thereon;

a cavity formed in or on said movable portion wherein said cavity has an opening facing a portion of said reference surface wherein said portion includes said targetable objects;

at least one optical sensor embedded in said cavity;

at least one light source embedded in said cavity;

said device being configured to create an image frame defined by said at least one optical sensor which is located in said cavity, wherein said image frame is capable of being electronically represented as a pixel image digitally representing a portion of said reference surface having said multiple targetable objects thereon; wherein said portion of said reference surface is illuminated by light from said at least one light source and whereby said plurality of targetable objects is captured in said pixel image and wherein said plurality of targetable objects is chosen to be in the form of clusters of targetable objects arranged about the periphery of a virtual circle denoted a "pseudo-circle" and wherein the motion of said targetable objects is represented in terms of the motion of said pseudo-circle;

said device being capable of forming a plurality of said pixel images, corresponding to said reference surface with said targetable objects thereon, wherein said plurality of images correspond to the relative positions of said movable portion to said reference surface;

said device being capable of making an image frame comparison, whereby differences between said images are compared metrically and/or geometrically using said pseudo-circle as a moving reference system to provide what are denoted lumped motion vectors for said multiple targetable objects corresponding to said changes in said images; wherein each said lumped motion vector is capable of being decomposed into a translational part and a rotational part.

* * * * *

UNITED STATES PATENT AND TRADEMARK OFFICE
CERTIFICATE OF CORRECTION

PATENT NO.      : 9,733,727 B2
APPLICATION NO. : 14/056140
DATED           : August 15, 2017
INVENTOR(S)     : Lee It is certified that error appears in the above-identified patent and that said Letters Patent is hereby corrected as shown below:

In the Specification

Column 11, Lines 26-30 replace Equation (13) with:

$$s(i,j) = \frac{1}{4}\Big[[v_x(i,j) - v_x(i-1,j)]^2 + [v_x(i+1,j) - v_x(i,j)]^2 + [v_x(i,j+1) - v_x(i,j)]^2 + [v_x(i,j) - v_x(i,j-1)]^2 + [v_y(i,j) - v_y(i-1,j)]^2 + [v_y(i+1,j) - v_y(i,j)]^2 + [v_y(i,j+1) - v_y(i,j)]^2 + [v_y(i,j) - v_y(i-1,j)]^2\Big] \quad (13)$$

-- --.

Signed and Sealed this
Twenty-seventh Day of February, 2018

Andrei Iancu
*Director of the United States Patent and Trademark Office*